(12) United States Patent
Jang et al.

(10) Patent No.: US 11,817,918 B2
(45) Date of Patent: Nov. 14, 2023

(54) REDUNDANCY OF DISTRIBUTED ANTENNA SYSTEMS

(71) Applicant: Solid, Inc., Seongnam-si (KR)

(72) Inventors: Ho Sik Jang, Seongnam-si (KR); Hoo Pyo Hong, Seongnam-si (KR); Hyong Ho Kim, Seoul (KR); Dong Hee Kwon, Yongin-si (KR); Kyung Eun Han, Suwon-si (KR); Jin Hwa Ku, Suwon-si (KR); Dae Young Kim, Seoul (KR); Young Man Cho, Seoul (KR)

(73) Assignee: Solid, Inc., Seongnam-si (KR)

( * ) Notice: Subject to any disclaimer, the term of this patent is extended or adjusted under 35 U.S.C. 154(b) by 437 days.

(21) Appl. No.: 17/272,937

(22) PCT Filed: Jul. 25, 2019

(86) PCT No.: PCT/KR2019/009261
§ 371 (c)(1),
(2) Date: Mar. 3, 2021

(87) PCT Pub. No.: WO2020/045828
PCT Pub. Date: Mar. 5, 2020

(65) Prior Publication Data
US 2022/0352929 A1 Nov. 3, 2022

(30) Foreign Application Priority Data
Aug. 30, 2018 (KR) .......... 10-2018-0102988

(51) Int. Cl.
*H04B 7/022* (2017.01)
*H04B 17/11* (2015.01)
(Continued)

(52) U.S. Cl.
CPC .......... *H04B 7/022* (2013.01); *H04B 7/2609* (2013.01); *H04B 17/11* (2015.01); *H04B 17/15* (2015.01);
(Continued)

(58) Field of Classification Search
CPC ...... H04B 7/022; H04B 7/2609; H04B 17/11; H04B 17/15; H04B 17/29; H04B 7/26;
(Continued)

(56) References Cited

U.S. PATENT DOCUMENTS 7,599,285 B2 * 10/2009 Zhou .................. H04L 12/2854
370/220
10,411,805 B2 * 9/2019 Sabat, Jr. ......... H04B 10/25752
(Continued)

FOREIGN PATENT DOCUMENTS

JP 2012-227663 A1 11/2012
KR 10-0527073 B1 11/2005
(Continued)

OTHER PUBLICATIONS

Extended European Search Report dated May 11, 2022 for European Application No. 19854644.2.

*Primary Examiner* — Don N Vo
(74) *Attorney, Agent, or Firm* — INSIGHT LAW GROUP, PLLC; Seung Lee

(57) ABSTRACT

A distributed antenna system of the present invention implements duplication by a method of configuring a first headend unit and a second headend unit in an active state or in a standby state and connecting a hub unit or a remote unit to the first headend unit and the second headend unit and by a method of connecting, through a redundancy link, a hub unit or remote units of a branch group branched from and connected to each headend unit, activating the redundancy link according to the control of an active headend unit when
(Continued)

an error occurs in a frame transmission path, and changing logical port states of a hub unit or remote units that cannot transmit frames due to the error in order to change the frame transmission path so that frame transmission is possible through the activated redundancy link.

20 Claims, 17 Drawing Sheets

(51) Int. Cl.
  *H04B 17/15* (2015.01)
  *H04B 17/29* (2015.01)
  *H04B 7/26* (2006.01)
  *H04Q 3/00* (2006.01)
(52) U.S. Cl.
  CPC ............ *H04B 17/29* (2015.01); *H04Q 3/0075* (2013.01); *H04Q 3/0087* (2013.01); *H04Q 2213/13098* (2013.01); *H04Q 2213/145* (2013.01); *H04Q 2213/167* (2013.01)

(58) Field of Classification Search
  CPC ............... H04Q 3/0075; H04Q 3/0087; H04Q 2213/13098; H04Q 2213/145; H04Q 2213/167; H04Q 3/00; H04W 88/085
  USPC .................................................. 375/262, 267
  See application file for complete search history.

(56) References Cited

U.S. PATENT DOCUMENTS

| | | | |
|---|---|---|---|
| 2012/0183028 A1* | 7/2012 | Han | H04W 48/16 455/507 |
| 2015/0078471 A1* | 3/2015 | Lemson | H04B 7/022 375/267 |
| 2017/0149505 A1* | 5/2017 | Yeo | H04B 7/022 |
| 2017/0366268 A1 | 12/2017 | Trajkovic et al. | |
| 2019/0037286 A1* | 1/2019 | Ghuman | H04J 14/0291 |

FOREIGN PATENT DOCUMENTS

| | | |
|---|---|---|
| KR | 10-2016-0081123 A | 7/2016 |
| KR | 10-2017-0091746 A | 8/2017 |
| WO | 2011-156465 A1 | 12/2011 |

* cited by examiner

REDUNDANCY OF DISTRIBUTED ANTENNA SYSTEMS

TECHNICAL FIELD

The present invention relates to a distributed antenna system for high availability. In particular, the present invention discloses duplication of a headend unit and duplication that can prepare for an error of link connection between a headend unit and a sub-node or between sub-nodes.

BACKGROUND ART

A distributed antenna system includes a headend unit connected to a base station of a mobile communication system, a remote unit connected to the headend unit through a transmission medium such as an optical cable, etc. and is installed in a region where radio waves are not received or weakly received, such as the inside of buildings, subways, and tunnels, to extend the coverage of base station signals.

In general, a distributed antenna system focuses on the purpose of covering a shadow area which it is difficult for base station signals to reach. Also, a distributed antenna system does not consider duplication due to problems such as facility cost and operation cost, and the need for such consideration is also not great.

Recently, in preparation for disasters, central governments have established an emergency service network as a wireless communication network to quickly and efficiently manage the disasters. In addition, a method of exclusively building a Long-Term Evolution (LTE) network for such an emergency service network, a method of utilizing the existing commercial networks, and the like are being considered. In particular, in the case of the UK, the existing Terrestrial Trunked Radio (TETRA)-based emergency service network is being replaced with an LTE-based public safety communication network.

As an emergency service network is built on the basis of an LTE network, the emergency service network, like the existing commercial network, requires a distributed antenna system to extend the coverage of base station signals. Since an emergency service network requires stronger system stability compared to the existing commercial network, high availability is also required for a distributed antenna system used for the emergency service network.

DISCLOSURE

Technical Problem

The proposed invention is directed to duplication of a headend unit to achieve high availability of a distributed antenna system connected to a duplicated base station that provides the same technology service.

Also, the proposed invention is directed to supporting high availability in a distributed antenna system by providing a link duplication method in which, when a link error occurs on a frame transmission path between a hub unit or a remote unit and a headend unit, the frame transmission path is changed to a frame transmission path that uses a redundancy link to enable frame transmission.

Technical Solution

According to an aspect, a distributed antenna system includes a first headend unit, a second headend unit, a first branch group, and a second branch group.

The first and second headend units receive a mobile communication signal from a base station and configure and manage topology information of the distributed antenna system. The first and second headend units add a state bit indicating a corresponding duplication state to a control field of a downlink frame and transmit the downlink frame.

The first branch group includes a hub unit and a remote unit. The hub unit is branched from and connected to the first headend unit and the second headend unit and is configured to distribute a mobile communication signal received from the first headend unit or the second headend unit into a remote unit, which is a sub-node. In this case, the hub unit transmits only a downlink frame received from the active headend unit to a sub-node.

The remote unit is connected to the hub unit as a sub-node and is configured to wirelessly transmit the distributed mobile communication signal through an antenna.

According to an additional aspect, a distributed antenna system connects, through a redundancy link, hub units of a branch group branched from and connected to first and second headend units, activates the redundancy link according to the control of an active headend unit when an error occurs in a frame transmission path, and changes logical port states of hub units that cannot transmit frames due to the error in order to change the frame transmission path so that frame transmission is possible through the activated redundancy link.

According to another aspect, a distributed antenna system includes a first headend unit, a second headend unit, a third branch group, and a fourth branch group.

The first and second headend units receive a mobile communication signal from a base station and configure and manage topology information of the distributed antenna system. The first and second headend units add a state bit indicating a corresponding duplication state to a control field of a downlink frame and transmit the downlink frame.

The third branch group and the fourth branch group may each include a plurality of remote units branched from and connected to the first headend unit and the second headend unit and connected to one another in cascade to wirelessly transmit a mobile communication signal received from the first headend unit or the second headend unit through an antenna.

According to an additional aspect, a distributed antenna system connects, through a redundancy link, remote units of a branch group branched from and connected to first and second headend units, activates the redundancy link according to the control of an active headend unit when an error occurs in a frame transmission path, and changes logical port states of remote units that cannot transmit frames due to the error in order to change the frame transmission path so that frame transmission is possible through the activated redundancy link.

Advantageous Effects

According to the proposed invention, it is possible to increase the availability of a distributed antenna system by duplicating a head unit of the distributed antenna system connected to a duplicated base station.

Also, according to the proposed invention, it is possible to increase the availability of a distributed antenna system because by connecting a redundancy link in case of a link error on a frame transmission path between a hub unit or a remote unit and a headend unit, the frame transmission path is changed to a frame transmission path that uses the redundancy link to enable frame transmission when an error occurs.

MODE FOR CARRYING OUT THE INVENTION

Figure 1:
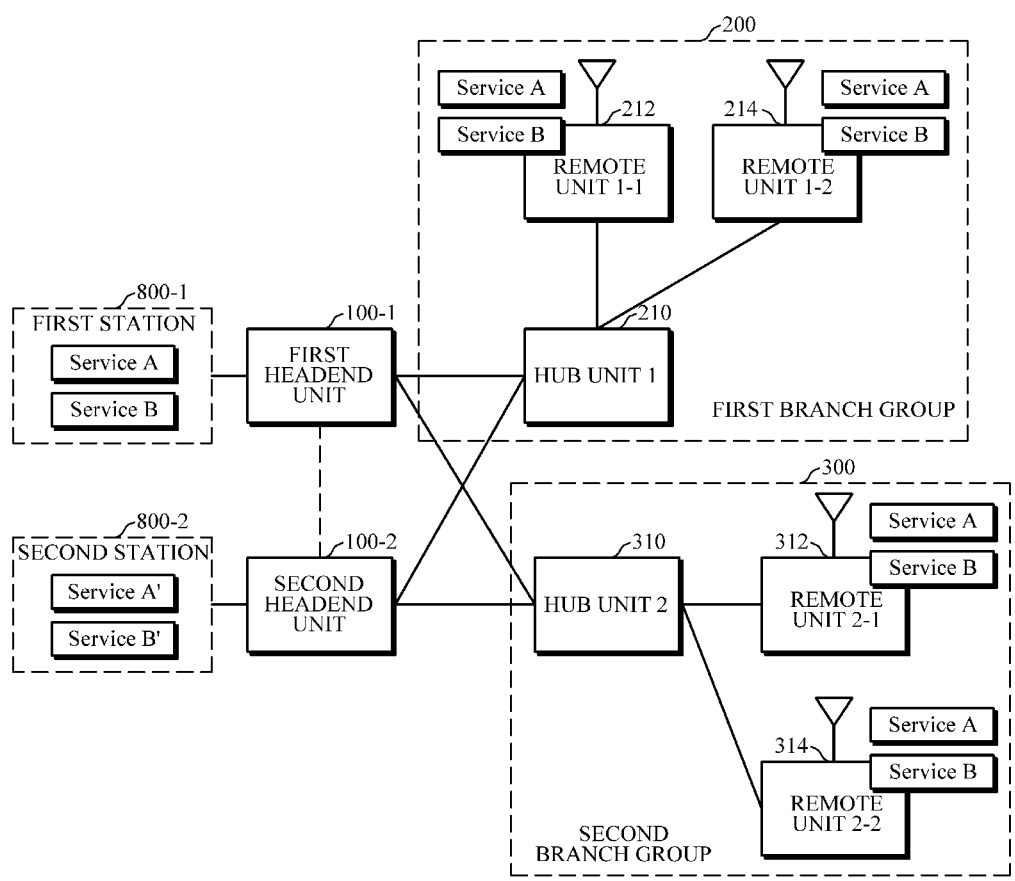
FIG. 1 is a diagram showing that a headend unit is duplicated through a duplication configuration of a distributed antenna system according to an embodiment.

The above or other aspects will be implemented through embodiments described with reference to the accompanying drawings. It is to be understood that elements in each embodiment can be variously combined with other elements in the corresponding embodiment or elements in the other embodiments unless otherwise stated or as long as there is no contradiction therebetween. In some cases, each block of a block diagram may represent a physical component. In other cases, each block may logically represent a partial function of a single physical component or a common function of a plurality of physical components. Sometimes, actually, a block or a part thereof may be a set of program instructions. Some or all of the blocks may be implemented in hardware, software, or a combination thereof.

A transmission frame transmitted or received by each device in a distributed antennal system may include three kinds of information. Signal data, control and management (C&M) data, and a control field are included in the transmission frame. The signal data includes various types of data transmitted between a headend and a hub or a remote. The C&M data is Ethernet frame format data for a control message transmitted or received between distributed antenna system devices. The control field is used only for communication between directly connected devices and is used to control other devices or deliver information using specific fields in the frame. The control field may be mainly used to control a link of a directly connected device, to deliver time synchronization information of a directly connected device, to request a restart from a directly connected device, to deliver link reception quality to a directly connected device, and to deliver a duplication state of a directly connected device. In particular, when the control field is used for link control, transmission may be made to a connected device regardless of a port state. The C&M data may be used to control devices that are not directly connected unlike the control field.

In a distributed antenna system, a transmission frame transmitted or received by each device may be classified as a forward signal frame or a reverse signal frame depending on a frame delivery direction. The forward signal frame is a signal frame delivered from a mobile communication system-related base station to a remote unit, and the reverse signal frame is a signal frame delivered from a remote unit to a mobile communication system-related base station.

Devices included in the distributed antenna system, i.e., a headend unit, a hub unit, and a remote unit have two categories of connection ports. That is, each device has a physical port that exists physically in the corresponding device and a logical port that is classified according to a function upon service implementation.

The physical port of the headend unit includes a downlink port and an extension port.

The downlink port of the headend unit is a physical port connected to an uplink port of the hub unit or an uplink port of the remote unit. In this case, an optical cable may be used to connect the ports, but the invention is not limited thereto.

The physical port of the hub unit includes an uplink port, an extension port, and a downlink port.

The uplink port of the hub unit is a physical port connected to the downlink port of the headend unit or the extension port of another hub unit of the same branch group. In this case, an optical cable may be used to connect the ports, but the invention is not limited thereto.

The extension port of the hub unit is a physical port connected to the uplink port of the extension hub unit of the same branch group for the purpose of service extension or connected to the extension port of the hub unit of another branch group for the purpose of link duplication. In this case, an optical cable may be used to connect the ports, but the invention is not limited thereto.

The downlink port of the hub unit is a physical port connected to the uplink port of the remote unit, which is a sub-node. In this case, a CAT-6 cable may be used to connect the ports, but the invention is not limited thereto.

The remote unit may be branched from and connected to the hub unit or may be branched from and directly connected to the headend unit. When the remote unit is branched from and directly connected to the headend unit, another remote unit of the same branch group may be connected to a remote unit directly connected to the headend unit in cascade.

When the remote unit is connected in cascade, the physical port of the remote unit includes an uplink port and a cascade port.

The uplink port of the remote unit is a physical port connected to the downlink port of the headend unit or connected to the cascade port of the upper remote unit. In this case, an optical cable may be used to connect the ports, but the invention is not limited thereto.

The cascade port of the remote unit is a physical port connected to the uplink port of another remote unit of the same branch group for the purpose of service extension or connected to the cascade port of the remote unit of another branch group for the purpose of link duplication. In this case, an optical cable may be used to connect the ports, but the invention is not limited thereto.

The headend unit may include a logical downlink port (DPORT) as a logical port. The hub unit may include a logical uplink port (UPORT), a logical extension port (EPORT), a logical redundancy port (RPORT), and DPORT as logical ports. The remote unit may include UPORT, RPORT, and DPORT as logical ports.

The DPORT of the headend unit is connected to the UPORT of the hub unit or the UPORT of the remote unit.

The UPORT of the hub unit is connected to the DPORT of the headend unit or the EPORT of another hub unit of the same branch group. The EPORT is connected to the UPORT of the extension hub unit of the same branch group for the purpose of service extension. The RPORT is connected to the RPORT of the hub unit of another branch group for the purpose of redundancy connection, i.e., link duplication. The DPORT of the hub unit is connected to the UPORT of the remote unit, which is a sub-node.

The UPORT of the remote unit is connected to the DPORT of the headend unit or the DPORT of the upper remote unit of the same branch group. The RPORT is connected to the RPORT of the remote unit of another branch group for the purpose of redundancy connection, i.e., link duplication. The DPORT is connected to the UPORT of the lower remote unit of the same branch group.

The logical port of each device of the distributed antenna system may have states such as "Disabled," "Blocking," Forwarding A," and "Forwarding B."

The "Disabled" state is a state in which the system is first started. That is, the "Disabled" state is a state after each device is booted and before a link connection is made.

The "Blocking" state is a state when a physical link connection is made but a logical port has not yet been determined. Also, the "Blocking" state is a state used when a logical port is determined but data transmission is blocked through the corresponding port.

In the "Blocking" state, the C&M data and the signal data except for the control field are blocked from being transmitted. Each device may determine a logical port by acquiring port information of a physically directly connected neighbor device using the control field in the "Blocking" state. However, the invention is not limited thereto. The type of the logical port may be stored as setting information, and the logical port may be determined according to the setting information.

The "Forwarding A" state is a state in which a forward signal frame is input from an upper connection device to a port and in which a reverse signal frame is output from a port to an upper connection device.

The "Forwarding B" state is a state in which a forward signal frame is output from a port to a lower connection device and in which a reverse signal frame is input from a lower connection device to a port.

Between devices connected through a link, a forward signal frame is delivered from a port in the "Forwarding B" state to a port in the "Forwarding A" state, and a reverse signal frame is delivered from a port in the "Forwarding A" state to a port in the "Forwarding B" state.

When the state of the port is the "Forwarding A" state or the "Forwarding B" state, each device may transmit all of the control field, the C&M data, and analog signal data or digital signal data.

A normal frame transmission path is a path in which a frame is transmitted when there is no redundancy link connection in the distributed antenna system and in which, although there is a redundancy link connection, a frame is transmitted without using the redundancy link connection.

In each embodiment, a distributed antenna system may be applied to various networks such as a military communication network or an emergency service network (ESN), which requires high availability, in addition to general commercial mobile communication networks.

FIG. 1 is a diagram showing that a headend unit is duplicated through a duplication configuration of a distributed antenna system according to an embodiment. According to an embodiment of the invention, the duplication configuration of the distributed antenna system includes a first headend unit 100-1, a second headend unit 100-2, a first branch group 200, and a second branch group 300. The first headend unit 100-1 is connected to a first base station 800-1, and the second headend unit 100-2 is connected to a second base station 800-2. When a service error occurs in one base station or one headend, the first base station 800-1 and the second base station 800-2 provide a service such that the service disruption to subscribers connected to the distributed antenna system can be prevented. In this case, the service duplicated between the two base stations need not have the same frequency and band. However, for service continuity for subscribers, the same technology and operator service should be provided by the two base stations. In the event of an error, a subscriber that was connected to the distributed antenna system and that has received the service may be guaranteed continuous service through reconnection.

The first headend unit 100-1 is connected to the first base station 800-1 to receive a mobile communication signal from the first base station 800-1. The first headend unit 100-1 generates a downlink frame for the received signal and transmits the downlink frame through the downlink port. Also, the first headend unit 100-1 configures and manages topology information of the distributed antenna system.

The second headend unit 100-2 is connected to the second base station 800-2 to receive a mobile communication signal from the second base station 800-2. The second headend unit 100-2 generates a downlink frame for the received mobile communication signal and transmits the downlink frame through the downlink port. Also, the second headend unit 100-2 configures and manages topology information of the distributed antenna system.

The first headend unit 100-1 and the second headend unit 100-2 may convert the power of a mobile communication signal transmitted from the base station into power suitable for processing at each node. The first headend unit 100-1 and the second headend unit 100-2 may combine mobile communication signals and may serve to distribute the composite signal to a hub unit or a remote unit. That is, the first headend unit 100-1 and the second headend unit 100-2 may be devices that relay a mobile communication signal between the hub unit or the remote unit and a radio access network (RAN) of a mobile communication system.

Figure 2:
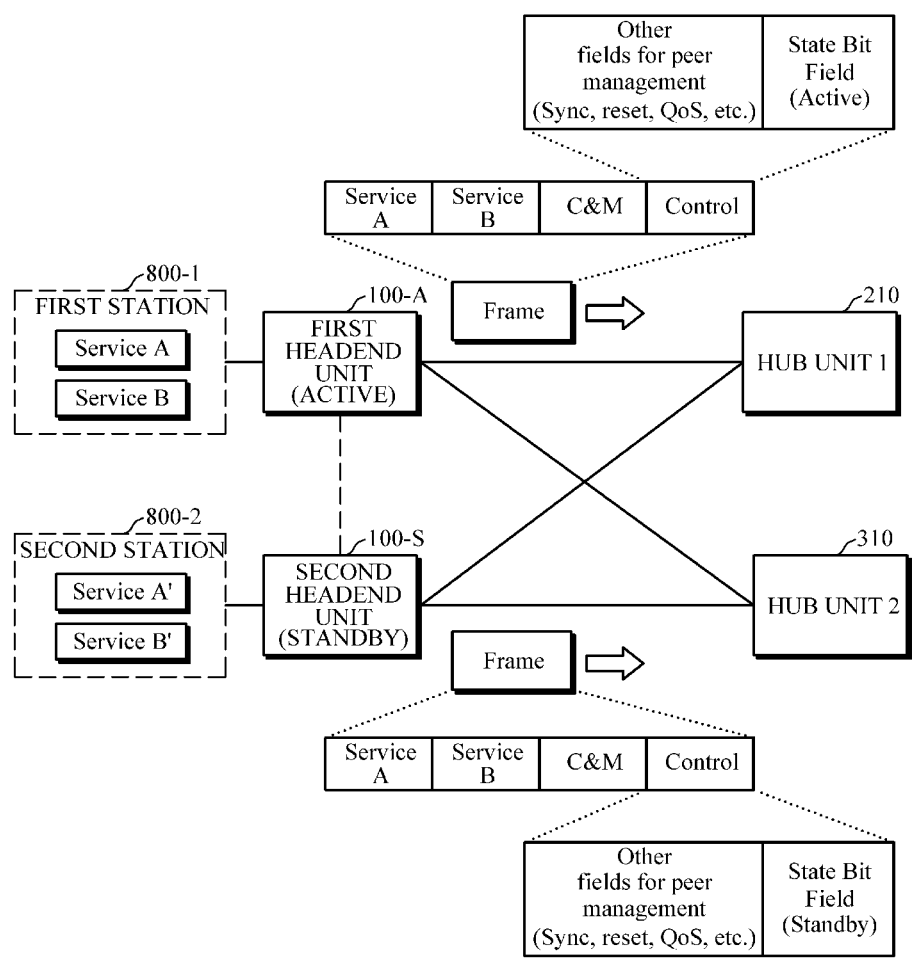
FIG. 2 is a diagram showing a method in which a headend unit delivers a duplication state to a sub-node using a control field.

FIG. 2 is a diagram showing a method in which a headend unit delivers a duplication state to a sub-node using a control field. As shown in FIG. 2, in order to duplicate the distributed antenna system, one of the first headend unit 100-1 or the second headend unit 100-2 operates in an active state, and the other headend unit operates in a standby state. Each of the headend units 100-1 and 100-2 adds a state bit indicating a duplication state (an active or standby state) of the headend unit to the control field of the downlink frame and then transmits the downlink frame.

Also, the first headend unit 100-1 and the second headend unit 100-2 configure and manage topology information of the system using system setting information and exchanging a keepalive and a state message with sub-units. This topology information may be used when the active headend unit 100-A determines a node for which a frame transmission path needs to be changed in a link error state, which will be described below.

The first branch group 200 includes a hub unit and a remote unit. The branch group is a set of sub-nodes branched from and connected to a downlink port of a headend unit. As an example, all sub-nodes connected to port #1 of the first headend unit 100-1 (which is used as the downlink port) constitute one branch group. In the embodiment shown in FIG. 1, a hub unit 1 210 and a remote unit 1-1 212 and a remote unit 1-2 214 connected to the hub unit 1 210 constitute a first branch group 200.

The hub unit may be branched from and connected to the downlink port of the headend unit. The headend unit and the remote unit may be directly connected to each other, but since the number of physical ports of the headend unit is limited, the headend unit may be connected to more remote devices using a hub unit, which is an extension device.

According to an aspect, the hub unit may be connected to the headend unit and may be connected to up to eight remote units. The invention is not limited thereto, and other connection methods may be used according to a required transmission capacity and method.

The hub unit distributes a downlink frame received from the headend unit into a remote unit, which is a sub-node connected to the downlink port.

The hub unit of the first branch group 200 or the second branch group 300, which is directly connected to the first headend unit 100-1 and the second headend unit 100-2 and which is configured to receive the downlink frame, checks a state bit of the control field of the downlink frame, delivers only a downlink frame received from the active headend unit 100-A to a sub-node connected to its downlink port, and discards a downlink frame received from a standby headend unit 100-S.

The remote unit is connected to the hub unit as a sub-node and is configured to restore a mobile communication signal from the distributed downlink frame and wirelessly transmit the mobile communication signal through an antenna. A plurality of remote units may be connected to the hub unit.

Figure 14:
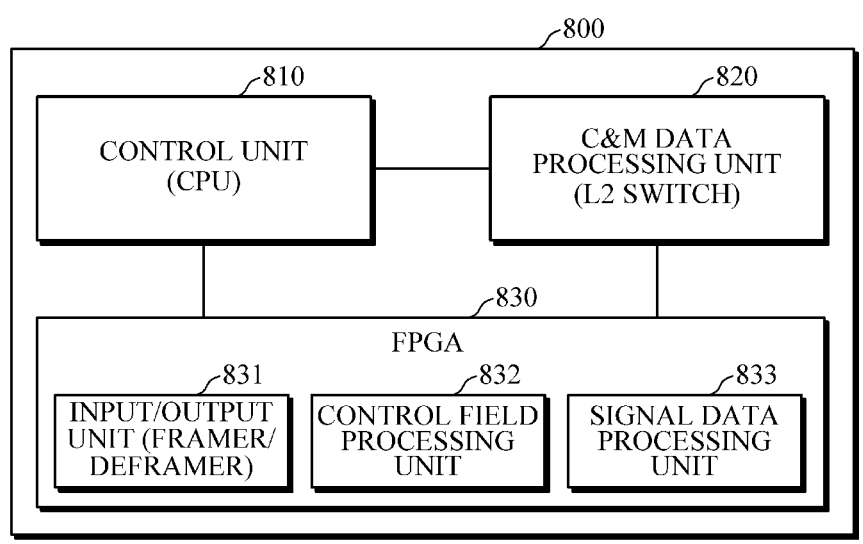
FIG. 14 is a block diagram showing an internal block structure for frame processing of a system unit of a distributed antenna system.
Figure 15:
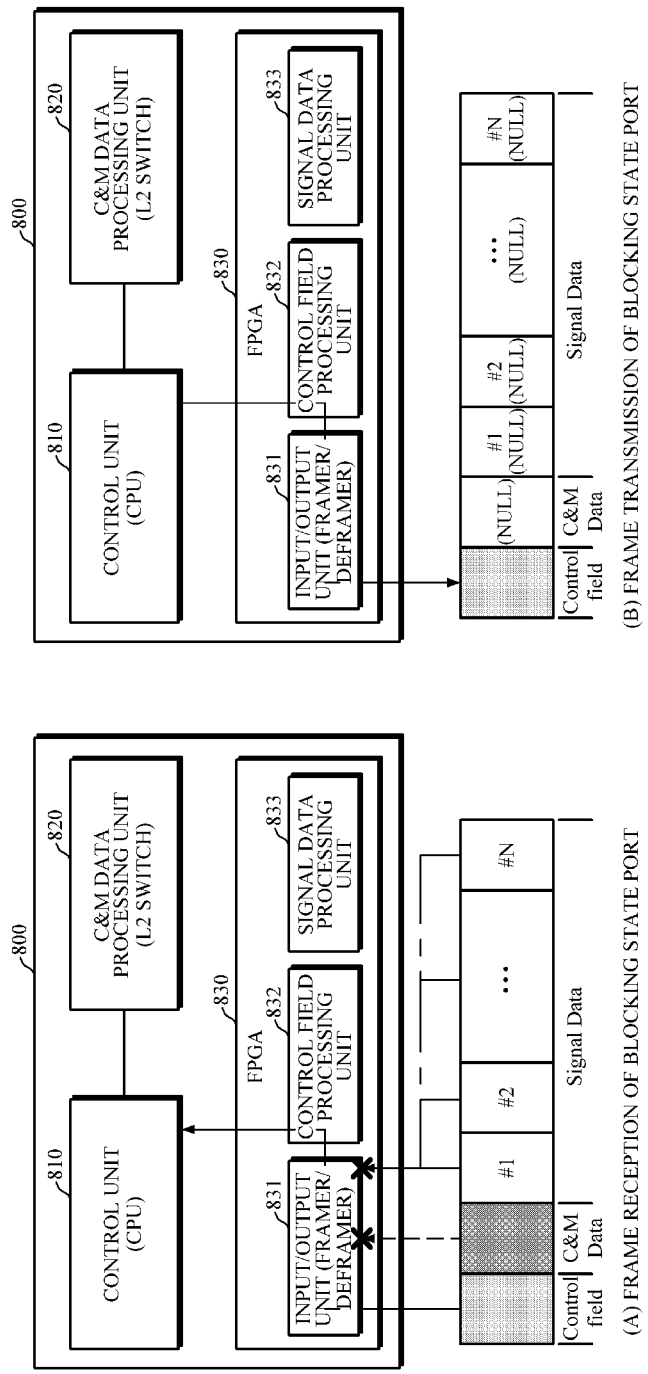
FIG. 15 is a block diagram showing frame processing when a port state of a system unit of a distributed antenna system is "Blocking."

FIG. 14 is a block diagram showing an internal block structure for frame processing of a system unit of a distributed antenna system, and FIG. 15 is a block diagram showing frame processing when a port state of a system unit of a distributed antenna system is "Blocking." A system unit 800 is one of a headend unit, a hub unit, or a remote unit.

The headend unit, the hub unit, or the remote unit may include a control unit 810, an input/output unit 831, a control field processing unit 832, a C&M data processing unit 820, and a signal data processing unit 833 for the purpose of frame processing.

The control unit 810 may be executed in a central processing unit (CPU) and implemented to control the input/output unit 831, the control field processing unit 832, the C&M data processing unit 820, and the signal data processing unit 833. That is, the control unit 810 may be configured as a set of instructions that are executed in the CPU.

The input/output unit 831 may deserialize inputs of the ports to restore a frame, deliver a control field, C&M data, and signal data included in the frame to corresponding processing units, combine pieces of data received from the control field processing unit 832, the C&M data processing unit 820, and the signal data processing unit 833 to generate a frame, serialize the frame, and output the frame to each port and may be implemented as a field-programmable gate array (FPGA) 830.

The control field processing unit 832 may deliver, to the control unit 810, control information and the like originating from the control field received through the input/output unit 831 to allow the control unit 810 to exchange link control information or the like with a directly connected device. The control field processing unit 832 may transmit, receive, and process control information or the like of a directly connected device even when the port state is "Blocking." The control field processing unit 832 may be implemented as an FPGA 830.

The C&M data processing unit 820 may deliver, to the control unit 810, the C&M data received through the input/output unit 831 to allow the control unit 810 to exchange Ethernet data with another device included in the distributed antenna system. The C&M data processing unit 820 may transmit, receive, and process the C&M data only when the port state is "Forwarding A" or "Forwarding B." The C&M data processing unit 820 may be implemented as an internal function of the FPGA 830 or an Ethernet L2 switch.

The signal data processing unit 833 may perform a function of delivering an analog or digital mobile communication signal from a headend unit to a radio unit or delivering a signal of a radio unit to a headend unit. The signal data processing unit 833 may transmit, receive, and process the signal data only when the port state is "Forwarding A" or "Forwarding B." The signal data processing unit 833 may be implemented as an FPGA 830.

As shown in FIG. 15, when the port state is "Blocking," the system unit 800 receives and processes only a control field in a frame received through an input port and blocks signal data and C&M data. Also, when the port state is "Blocking," the system unit 800 generates a frame including a control field and C&M data and signal data consisting of null data and outputs the frame through the output port.

According to another embodiment of the invention, the first headend unit 100-1 and the second headend unit 100-2 are configured through duplication, and the hub unit of the first branch group 200 and the hub unit of the second branch group 300 are connected to each other through a redundancy link. The first headend unit 100-1 and the second headend unit 100-2 are each determined as the active headend unit 100-A or the standby headend unit 100-S. In an example shown in FIG. 2, the first headend unit 100-1 is in the active state, and the second headend unit 100-2 is in the standby state.

When a downlink frame is received from each of the first headend unit 100-1 and the second headend unit 100-2, the hub unit of the first branch group 200 or the second branch group 300 directly connected to the first headend unit 100-1 and the second headend unit 100-2 may store a state bit included in the downlink frame, add the state bit received from each headend unit to a control field of an uplink frame received from a sub-node connected to the downlink port, and transmit the uplink frame to the first headend unit 100-1 and the second headend unit 100-2.

Upon receiving the uplink frame, the first headend unit 100-1 and the second headend unit 100-2 may process the received uplink frame when their duplication states are active and may discard the received uplink frame when their duplication states are standby.

Also, each of the first headend unit 100-1 and the second headend unit 100-2 may compare the state bit of the control field included in the uplink frame to its duplication state and may transmit a C&M message notifying of its duplication state to the hub unit that has transmitted the corresponding uplink frame when the state bit is different from the duplication state. According to an aspect of the invention, the headend unit 100-A may increase a count value when continuously receiving an uplink frame with a state bit value of a control field different from its duplication state from a specific hub unit and may transmit a control command that resets the hub unit that has transmitted the corresponding uplink frame when the count value is greater than a predetermined threshold value.

Figure 3:
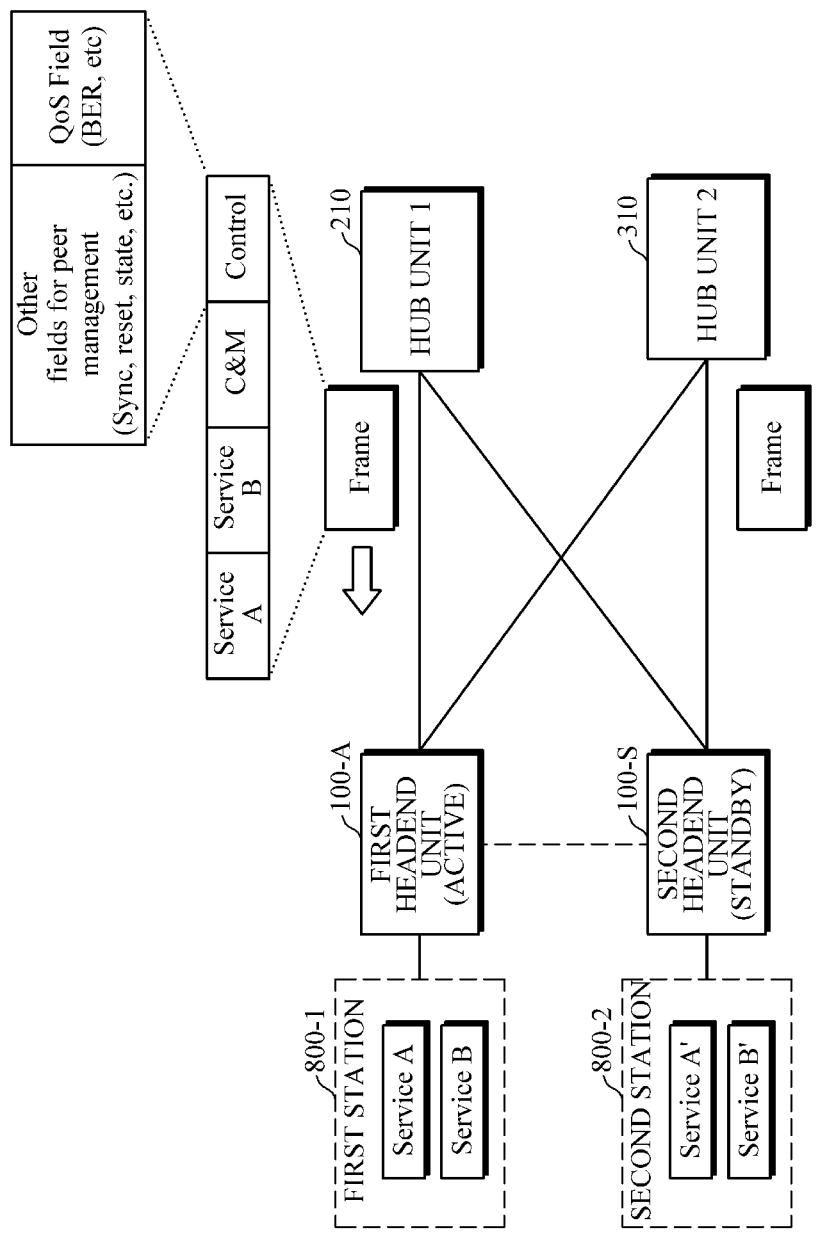
FIG. 3 is a diagram showing a method in which a sub-node directly connected to a headend unit adds a bit error rate (BER) value measured on a downlink to an uplink frame and delivers the uplink frame.

FIG. 3 is a diagram showing a method in which a sub-node directly connected to a headend unit adds a bit error rate (BER) value measured on a downlink to an uplink frame and delivers the uplink frame. According to another embodiment of the invention, the first headend unit 100-1 and the second headend unit 100-2 are configured through duplication, and the hub unit of the first branch group 200 and the hub unit of the second branch group 300 are connected to each other through a redundancy link. The first headend unit 100-1 and the second headend unit 100-2 are each determined as the active headend unit 100-A or the standby headend unit 100-S. In an example shown in FIG. 3, the first headend unit 100-1 is in the active state, and the second headend unit 100-2 is in the standby state.

The hub unit 210 or 310 of the first branch group 200 or the second branch group 300 directly connected to the first headend unit 100-1 and the second headend unit 100-2 may perform quality measurement on the downlink frame. At this time, the hub unit 210 or 310 may add the measured BER value to the control field of the uplink frame and transmit the uplink frame to the first headend unit 100-1 and the second headend unit 100-2.

The first headend unit 100-1 and the second headend unit 100-2 may acquire a BER value indicating the downlink quality included in the uplink frame and thus determine the downlink quality.

In this case, when the received BER value is greater than a predetermined BER threshold value, the active headend unit 100-A may determine whether to perform switching and may perform the switching. After performing the switching, the duplication state of the headend unit is changed from the active state to the standby state or from the standby state to the active state.

Figure 4:
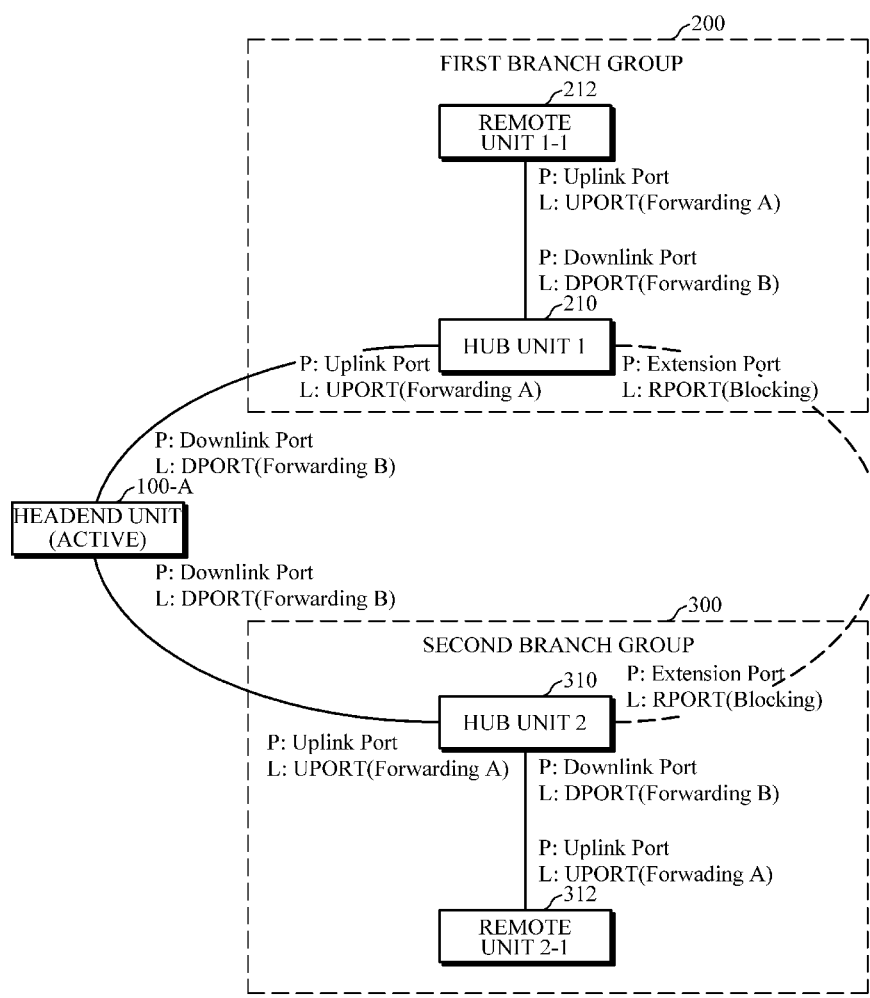
FIG. 4 is a diagram conceptually showing link duplication of a hub unit through a duplication configuration of a distributed antenna system according to another embodiment.

FIG. 4 is a diagram conceptually showing link duplication of a hub unit through a duplication configuration of a distributed antenna system according to another embodiment. According to another embodiment of the invention, the first headend unit 100-1 and the second headend unit 100-2 are configured through duplication, and the extension port of the hub unit of the first branch group 200 and the extension port of the hub unit of the second branch group 300 are connected to each other through a redundancy link in the "Blocking" state. One of the first headend unit 100-1 or the second headend unit 100-2 operates as an active headend unit 100-A.

In this state, when an error occurs in a normal frame transmission path of one branch group, the redundancy link may be activated, and units for which an error has occurred in frame transmission paths may transmit a frame through a normal frame transmission path of another branch group using the activated redundancy link as a bypass.

A connection between physical ports of devices in the embodiment shown in FIG. 4 will be described below. A first downlink port of the active headend unit 100-A is connected to the uplink port of the hub unit 1 210 of the first branch group 200, and a second downlink port is connected to the uplink port of the hub unit 2 310 of the second branch group 300.

Also, the extension port of the hub unit 1 210 is connected to the extension port of the hub unit 2 310 of the second branch group 300 for the purpose of link duplication, and the downlink port of the hub unit 1 210 is connected to the uplink port of the remote unit 1-1 212.

A connection between logical ports of devices in the embodiment shown in FIG. 4 will be described below. The DPORT of the active headend unit 100-A is connected to the UPORT of the hub unit 1 210 of the first branch group 200.

Also, the RPORT of the hub unit 1 210 is connected to the RPORT of the hub unit 2 310 of the second branch group 300 for the purpose of link duplication. Physically, the extension port of the hub unit 1 210 and the extension port of the hub unit 2 310 of the second branch group 300 are connected to each other. The DPORT of the hub unit 1 210 is connected to the UPORT of the remote unit.

In the embodiment shown in FIG. 4, a forward signal frame that is transmitted through a normal frame transmission path is output from the DPORT of the active headend unit 100-A in the "Forwarding B" state and input to the UPORT of the hub unit 1 210 in the "Forwarding A" state and is output from the DPORT of the hub unit 1 210 in the "Forwarding B" state and input to the UPORT of the remote unit 1-1 212 in the state "Forwarding A." A reverse signal is output from the UPORT of the remote unit 1-1 212 in the "Forwarding A" state and input to the DPORT of the hub unit 1 210 in the "Forwarding B" state and is output from the UPORT of the hub unit 1 210 in the "Forwarding A" state and input to the DPORT of the active headend unit 100-A in the "Forwarding B" state. As described above, the frame transmission path is determined according to the state of the logical port of each device.

Also, the second branch group 300 includes a hub unit and a remote unit. In FIG. 4, the hub unit 2 310 and a remote unit 2-1 312 connected to the hub unit 2 310 constitute the second branch group 300.

In the embodiment shown in FIG. 4, connections between physical ports and logical ports of devices may be described in the same manner as the above description of the connection between the physical ports of the devices of the first branch group 200.

The physical extension port of the hub unit of the first branch group 200 and the physical extension port of the hub unit of the second branch group 300 are connected to each other through the redundancy link in the "Blocking" state. That is, the RPORT of the hub unit of the first branch group 200 and the RPORT of the hub unit of the second branch group 300 are connected to each other, and each RPORT is managed in the "Blocking" state in order to use this connection as a redundancy link. In the embodiment shown in FIG. 4, the RPORT of the hub unit 1 210 and the RPORT of the hub unit 2 310 are connected to each other, and each RPORT is in the "Blocking" state.

The redundant link may be managed as a spare link when the connection of each device of the distributed antenna system is in the normal state and may be activated to resume frame transmission when an error occurs during a connection between devices so that the frame transmission is not performed.

When an error occurs in a normal frame transmission path of one branch group, the distributed antenna system activates the redundancy link and transmits a frame through a normal frame transmission path of another branch group using the activated redundancy link as a bypass to support high availability. In the embodiment of FIG. 4, when frame transmission is not performed due to an error having occurred in a link connection between the hub unit 1 210 of the first branch group 200 and the active headend unit 100-A, the redundancy links of the hub unit 1 210 and the hub unit 2 310 are activated. In this case, a reverse signal in the first branch group 200 is delivered to the second branch group 300 through the redundancy link and transmitted to the active headend unit 100-A through the normal frame transmission path of the second branch group 300, and a forward signal frame for the first branch group 200 is transmitted to the first branch group 200 via the second branch group 300 through the redundancy link. According to an aspect of the invention, the hub unit 2 310 of the second branch group 300 may combine a mobile communication signal of a remote unit of the second branch group 300 and a mobile communication signal of a remote unit of the first branch group 200 and transmit the composite signal.

In this case, the active headend unit 100-A should control each device to change its logical port state so that the frame transmission is possible through the redundancy link.

Figure 5:
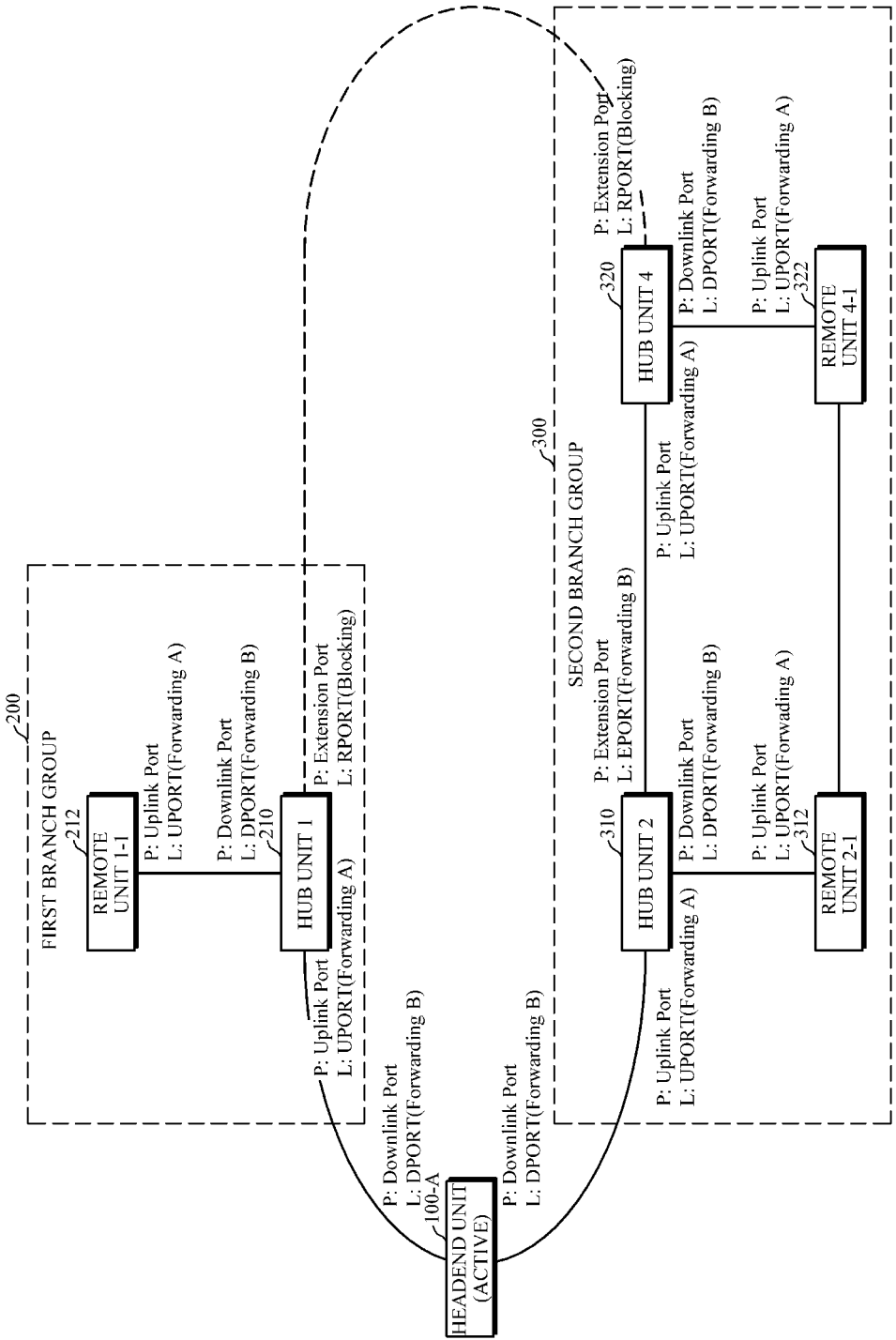
FIG. 5 is a diagram showing that a hub unit of a first branch group and an extension hub unit of a second branch group are connected through a redundancy link in a duplication configuration of a distributed antenna system according to another embodiment.

FIG. 5 is a diagram showing that a hub unit of a first branch group and an extension hub unit of a second branch group are connected through a redundancy link in a duplication configuration of a distributed antenna system according to another embodiment. According to another embodiment, the distributed antenna system has the first headend unit 100-1 and the second headend unit 100-2 configured through duplication, and the extension port of the hub unit of the first branch group 200 and the extension port of the extension hub unit of the second branch group 300 are connected to each other through the redundancy link in the "Blocking" state. One of the first headend unit 100-1 or the second headend unit 100-2 operates as an active headend unit 100-A.

The first branch group 200 or the second branch group 300 is connected to the extension port of the hub unit to expand the service area and may further include an extension hub unit and a plurality of remote units connected to the extension hub unit as sub-nodes.

The extension hub unit physically connects its uplink port to the extension port of a conventional hub unit. At this time, the EPORT of the conventional hub unit and the UPORT of the extension hub unit are connected to each other, the EPORT of the conventional hub unit has the "Forwarding B" state, and the UPORT of the extension hub unit has the "Forwarding A" state. Thus, a forward signal frame is transmitted from the conventional hub unit to the extension hub unit, and a reverse signal frame is transmitted from the extension hub unit to the conventional hub unit.

According to another embodiment of FIG. 5, it is shown that the second branch group 300 includes the hub unit 2 310 and the extension hub unit 4 320 and a remote unit 2-1 312 and a remote unit 4-1 322 connected to the hub unit 2 310 and the extension hub unit 4 320 respectively.

According to an embodiment shown in FIG. 5, physically, the extension port of the hub unit 2 310 of the second branch group 300 is connected to the uplink port of the hub unit 4 320, and the extension port of the hub unit 4 320 is connected to the extension port of the hub unit 1 210 of the first branch group 200 for the purpose of link duplication.

According to an embodiment shown in FIG. 5, the EPORT of the hub unit 2 310 of the second branch group 300 and the UPORT of the hub unit 4 320 are connected to each other.

Also, the RPORT of the hub unit 4 320 is connected to the RPORT of the hub unit 1 210 of the first branch group 200 for the purpose of link duplication. Physically, the extension port of the hub unit 4 320 and the extension port of the hub unit 1 210 of the first branch group 200 are connected to each other.

According to an embodiment shown in FIG. 5, a forward signal frame transmitted through a normal frame transmission path between remote units connected to the active headend unit 100-A and the hub unit 4 320 is output from the DPORT of the active headend unit 100-A in the Forwarding B state and input to the UPORT of the hub unit 2 310 in the "Forwarding A" state, is output from the EPORT of the hub unit 2 310 in the "Forwarding B" state and input to the UPORT of the hub unit 4 320 in the "Forwarding A" state, and is output from the DPORT of the hub unit 4 320 in the "Forwarding B" state and input to the UPORT of the remote unit in the "Forwarding A" state, and a reverse signal frame is output from the UPORT of the remote unit in the "Forwarding A" state and input to the DPORT of the hub unit 4 320 in the "Forwarding B" state, is output from the UPORT of the hub unit 4 320 in the "Forwarding A" state and input to the EPORT of the hub unit 2 310 in the "Forwarding B" state, and is output from the UPORT of the hub unit 2 310 in the "Forwarding A" state and input to the DPORT of the active headend unit 100-A in the "Forwarding B" state.

The physical extension port of the hub unit of the first branch group 200 and the physical extension port of the hub unit of the second branch group 300, which are not connected to other devices, are connected to each other through the redundancy link in the "Blocking" state.

That is, the RPORT of the hub unit of the first branch group 200 and the RPORT of the hub unit of the second branch group 300 are connected to each other, and each RPORT is managed in the "Blocking" state in order to use this connection as a redundancy link. In the embodiment shown in FIG. 5, the RPORT of the hub unit 1 210 and the RPORT of the hub unit 4 320 are connected to each other, and each RPORT is in the "Blocking" state.

In the embodiment of FIG. 5, when frame transmission is not performed due to an error having occurred in a link connection between the hub unit 1 210 of the first branch group 200 and the active headend unit 100-A, the redundancy links of the hub unit 1 210 and the hub unit 4 320 are activated. In this case, a reverse signal frame in the first branch group 200 is delivered to the second branch group 300 through the redundancy link and transmitted to the headend unit through the normal frame transmission path of the second branch group 300, and a forward signal frame for the first branch group 200 is transmitted to the first branch group 200 via the second branch group 300 through the redundancy link. According to an aspect of the invention, the hub unit 4 320 of the second branch group 300 may combine a mobile communication signal of the remote unit 4-1 322 and a mobile communication signal of the remote unit 1-1 212 of the first branch group 200 and transmit the composite signal.

In this case, the active headend unit 100-A should control each device to change its logical port state so that the frame transmission is possible through the redundancy link.

Figure 6:
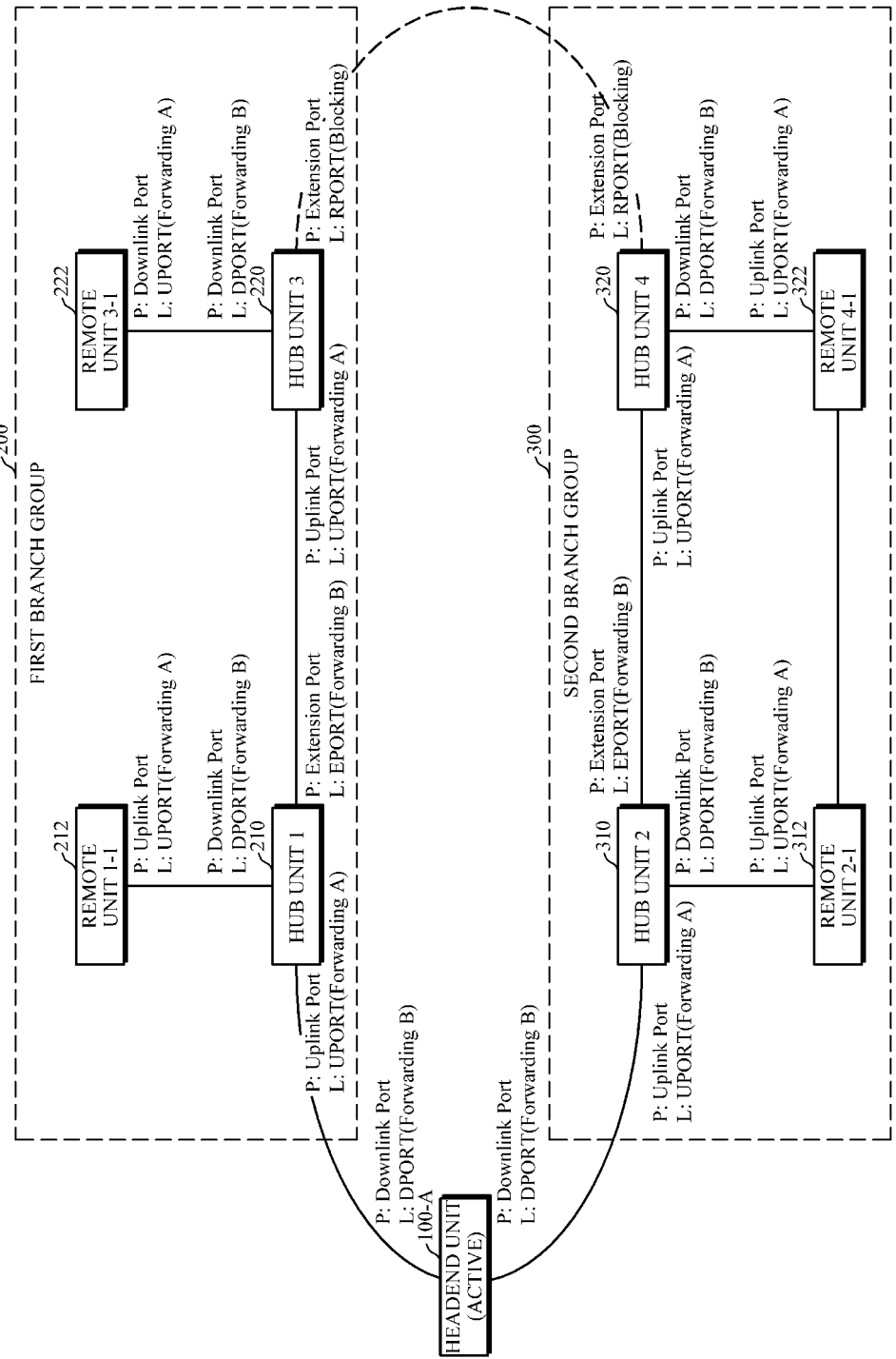
FIG. 6 is a diagram showing that an extension hub unit of a first branch group and an extension hub unit of a second branch group are connected through a redundancy link in a distributed antenna system according to another embodiment.

FIG. 6 is a diagram showing that an extension hub unit of a first branch group and an extension hub unit of a second branch group are connected through a redundancy link in a duplication configuration of a distributed antenna system according to another embodiment. According to another embodiment, the distributed antenna system has the first headend unit 100-1 and the second headend unit 100-2 configured through duplication, and the extension port of the hub unit of the first branch group 200 and the extension port of the extension hub unit of the second branch group 300 are connected to each other through the redundancy link in the "Blocking" state. One of the first headend unit 100-1 or the second headend unit 100-2 operates as an active headend unit 100-A.

In an example shown in FIG. 6, the first branch group 200 further includes an extension hub unit so that the first branch group 200 is extended in the same way as the second branch group in the embodiment shown in FIG. 5.

The description of the link connection of the first branch group 200 is the same as the description of the link connection of the second branch group 300 of the second embodiment.

However, there is a difference in that the extension port of the hub unit 2 310 and the extension port of the hub unit 4 320 are connected through a redundancy link.

According to an aspect of the invention, when a redundancy link is connected, the hub unit to which the redundancy link is connected transmits redundancy link connection information to the active headend unit 100-A and the standby headend unit 100-S. According to another aspect of the invention, when a redundancy link is connected, the hub unit to which the redundancy link is connected may transmit redundancy link connection information to the active headend unit 100-A and may deliver the redundancy link connection information through data synchronization between the active headend unit 100-A and the standby headend unit 100-S. In the embodiment shown in FIG. 4, the hub unit 1 210 and the hub unit 2 310 transmit the redundancy link connection information. In the embodiment shown in FIG. 5, the hub unit 1 210 and the hub unit 4 320 transmit the redundancy link connection information. In the embodiment shown in FIG. 6, the hub unit 2 310 and the hub unit 4 320 transmit the redundancy link connection information.

The active headend unit 100-A receives the redundancy link connection information from the hub unit and stores and manages the received redundancy link connection information so that the redundancy link is activated to change the frame transmission path when a link error occurs in the system.

According to another aspect of the invention, the active headend unit 100-A may detect a link error that has occurred in the system. As an example, the active headend unit 100-A periodically exchanges a keepalive message with sub-nodes and thus may determine a link error when the keepalive message is not received for a certain period of time. However, the invention is not limited thereto, and a method of detecting hardware abnormality or frame errors may be used.

When the active headend unit 100-A detects an error having occurred in a normal frame transmission path of one branch group, the active headend unit 100-A requests the activation of the redundancy link from the hub unit at one end to which the redundancy link is connected on the basis of the redundancy link connection information. In this case, by using the C&M data, the active headend unit 100-A may request the activation of the redundancy link from a hub unit of another branch group to which the redundancy link is connected from the branch group in which the error has occurred. The active headend unit 100-A may discover, from the stored redundancy link connection information, the hub unit to which the redundancy link is connected.

The active headend unit 100-A also determines hub units for which frame transmission paths need to be changed on the basis of the topology information. The active headend unit 100-A uses the topology information to determine a device capable of transmitting a frame using a redundancy link from among devices that cannot transmit frames due to a link error and that are included in subordinate devices in the system.

The active headend unit 100-A sends a frame transmission path change request to the determined hub unit. The active headend unit 100-A transmits a port state change request message to a hub unit for which a port state needs to be changed.

Upon receiving a redundancy link activation request, the hub unit requests the activation of the redundancy link by transmitting a redundancy port state change control request to the hub unit at the other end to which the redundancy link is connected through the control field, which is transmitted even in the "Blocking" state, and activates the redundancy link by changing the redundancy port state.

A case in which an error occurs in a link connection between the hub unit 1 210 of the first branch group 200 and the active headend unit 100-A in the distributed antenna system shown in FIG. 6 will be described below. Upon detecting an error in a corresponding link, the active headend unit 100-A changes the state of the DPORT connected to the hub unit 1 120 from "Forwarding B" to "Blocking" so as to prevent a loop that may occur due to the redundancy link activation and requests the activation of the redundancy link from the hub unit 4 320 of the second branch group using the C&M data with reference to the redundancy link connection information. The hub unit 4 320 requests the activation of the redundancy link from the hub unit 3 220 of the first branch group 200 to which the redundancy link is connected using the control field. The hub unit 3 220 changes the state of the RPORT from "Blocking" to "Forwarding A." The hub unit 4 320 changes the state of the RPORT from "Blocking" to "Forwarding B" to activate the redundancy link. The active headend unit 100-A recognizes that frames of the hub unit 1 210 and the hub unit 3 220 can be transmitted through the redundancy link and determines the hub unit 1 210 and the hub unit 3 220 as nodes for which frame transmission paths need to be changed on the basis of the topology information. The active headend unit 100-A transmits the C&M data to the hub unit 1 210 and the hub unit 3 220 (through the redundancy link) to request the change of the port state. The hub unit 1 210 changes the state of the UPORT from "Forwarding A" to "Blocking" and changes the state of the EPORT from "Forwarding B" to "Forwarding A." The hub unit 3 220 changes the state of the UPORT from "Forwarding A" to "Forwarding B."

Figure 7:
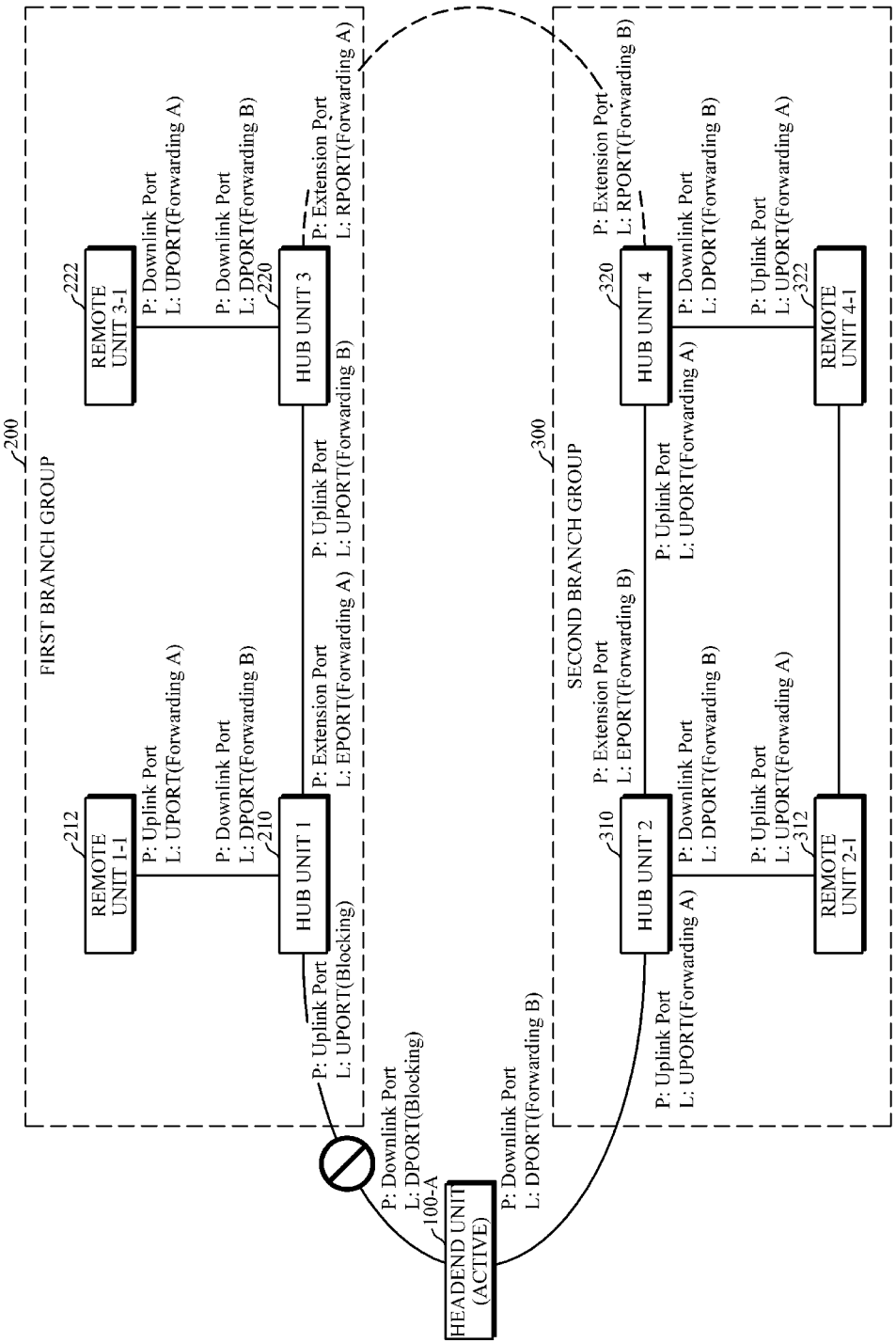
FIG. 7 shows a change of a frame path due to a link error between an active headend unit and a hub unit 1 120 in the embodiment shown in FIG. 6.

FIG. 7 shows that a frame path is changed due to a link error between an active headend unit and a hub unit 1 120 in the embodiment shown in FIG. 6. A reverse signal frame is transmitted from the remote unit 1-1 212 to the active headend unit 100-A through the hub unit 1 210, the hub unit 3 220, the hub unit 4 320, and the hub unit 2 310 in sequence, and a forward signal frame is transmitted from the active headend unit 100-A to the remote unit 1-1 212 through the hub unit 2 310, the hub unit 4 320, the hub unit 3 220, and the hub unit 1 210.

According to another aspect of the invention, the active headend unit 100-A may detect the recovery of the error that has occurred. When the active headend unit 100-A detects that the link connection in which the error has occurred is restored, the active headend unit 100-A requests the blocking of the redundancy path from the hub unit at one end to which the redundancy link is connected on the basis of the redundancy link connection information. In this case, by using the C&M data, the active headend unit 100-A may request the blocking of the redundancy link from a hub unit of another branch group to which the redundancy link is connected from the branch group in which the error has occurred. The active headend unit 100-A may discover, from the stored redundancy link connection information, the hub unit to which the redundancy link is connected.

The active headend unit 100-A also determines hub units for which frame transmission paths need to be changed to switch to a normal frame transmission path on the basis of the topology information. The active headend unit 100-A uses the topology information to determine a device for which a frame transmission path is to be changed due to a link error and which requires switching to the normal frame transmission path from among subordinate devices in the system.

The active headend unit 100-A sends a frame transmission path change request to the determined hub unit. The active headend unit 100-A transmits a port state change request message to a hub unit for which a port state needs to be changed.

Upon receiving a redundancy link blocking request, the hub unit requests the blocking of the redundancy link by transmitting a redundancy port state change control request to the hub unit at the other end to which the redundancy link is connected through the control field and blocks the redundancy link by changing the redundancy port state.

A case in which the link error having occurred between the active headend unit 100-A and the hub unit 1 210 as shown in FIG. 7 is recovered will be described below. When the active headend unit 100-A detects the recovery of the error in the corresponding link, the active headend unit 100-A determines the restoration of the normal frame transmission path. The active headend unit 100-A determines a sub-node for which a frame transmission path needs to be changed due to the restoration of the normal frame transmission path on the basis of the topology information. In this example, the hub unit 1 210 and the hub unit 3 220 are determined as nodes for which frame transmission paths need to be changed. The active headend unit 100-A transmits the C&M data to the hub unit 1 210 and the hub unit 3 220 (through the redundancy link) to request the change of the port state. The hub unit 1 210 changes the state of the UPORT from "Blocking" to "Forwarding A" and changes the state of the EPORT from "Forwarding A" to "Forwarding B." The hub unit 3 220 changes the state of the UPORT from "Forwarding B" to "Forwarding A."

The active headend unit 100-A requests the blocking of the redundancy link from the hub unit 4 320 of the second branch group 300 using the C&M data with reference to the redundancy link connection information. The hub unit 4 320 requests the blocking of the redundancy link from the hub unit 3 220 of the first branch group 200 to which the redundancy link is connected using the control field. The hub unit 3 220 changes the state of the RPORT from "Forwarding A" to "Blocking." The hub unit 4 320 changes the state of the RPORT from "Forwarding B" to "Blocking" to block the redundancy link.

The active headend unit 100-A changes the state of the DPORT connected to the hub unit 1 210 from "Blocking" to "Forwarding B" to complete switching to the normal frame transmission path. When the switching is completed, the state of the block diagram shown in FIG. 3 is obtained.

Figure 8:
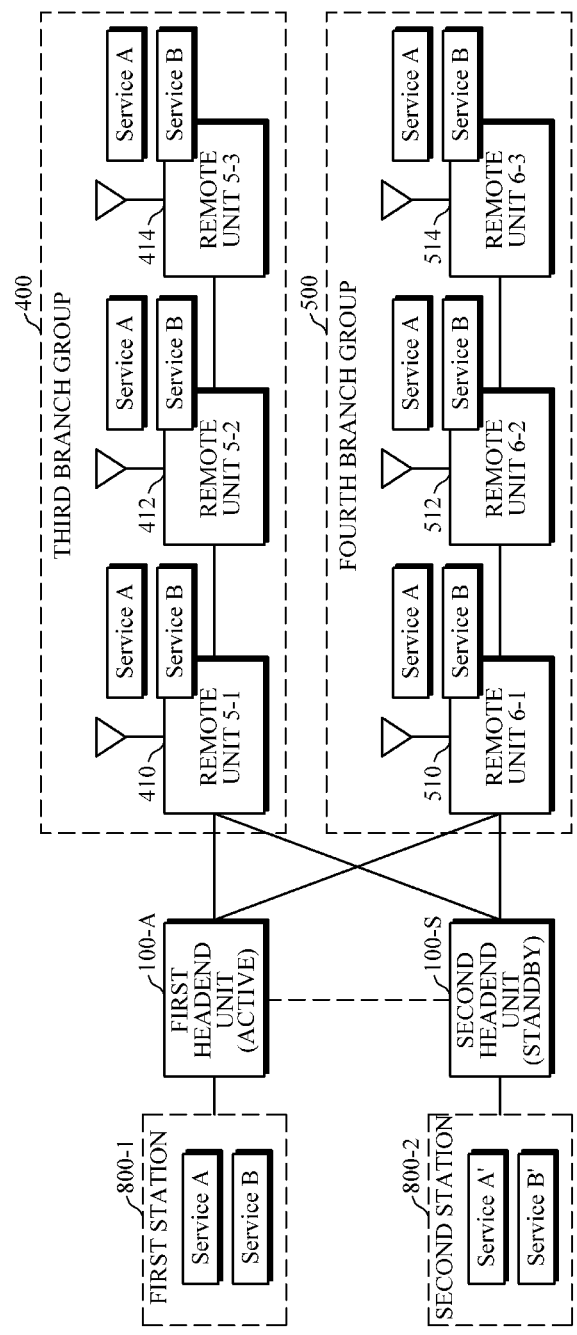
FIG. 8 is a diagram schematically showing a distributed antenna system in which a headend unit is duplicated according to another embodiment.

FIG. 8 is a diagram showing that a headend unit is duplicated through a duplication configuration of a distributed antenna system according to an embodiment. According to another embodiment of the invention, the duplication configuration of the distributed antenna system includes a first headend unit 100-1, a second headend unit 100-2, a third branch group 400, and a fourth branch group 500. The first headend unit 100-1 is connected to a first base station 800-1, and the second headend unit 100-2 is connected to a second base station 800-2. When a service error occurs in one base station or one headend, the first base station 800-1 and the second base station 800-2 provide a service such that the service disruption to subscribers connected to the distributed antenna system can be prevented.

The first headend unit 100-1 is connected to the first base station 800-1 to receive a mobile communication signal from the first base station 800-1. The first headend unit 100-1 generates a downlink frame for the received mobile communication signal and transmits the downlink frame through the downlink port. Also, the first headend unit 100-1 configures and manages topology information of the distributed antenna system.

The second headend unit 100-2 is connected to the second base station 800-2 to receive a mobile communication signal from the second base station 800-2. The second headend unit 100-2 generates a downlink frame for the received mobile communication signal and transmits the downlink frame through the downlink port. Also, the second headend unit 100-2 configures and manages topology information of the distributed antenna system.

The first headend unit 100-1 and the second headend unit 100-2 may convert the power of a mobile communication signal transmitted from the base station into power suitable for processing at each node. The first headend unit 100-1 and the second headend unit 100-2 may combine mobile communication signals and may serve to distribute the composite signal to a hub unit or a remote unit. That is, the first headend unit 100-1 and the second headend unit 100-2 may be devices that relay a mobile communication signal between the hub unit or the remote unit and a radio access network (RAN) of a mobile communication system.

In order to duplicate the distributed antenna system, one of the first headend unit 100-1 or the second headend unit 100-2 operates in the active state, and the other headend unit operates in the standby state. Each of the headend units 100-1 and 100-2 adds a state bit indicating a duplication state (an active or standby state) of the headend unit to the control field of the downlink frame and then transmits the downlink frame.

Also, the first headend unit 100-1 and the second headend unit 100-2 configure and manage topology information of the system using system setting information and exchanging a keepalive and a state message with sub-units. This topology information may be used when the active headend unit 100-A determines a node for which a frame transmission path needs to be changed in a link error state, which will be described below.

The third branch group 400 may include a plurality of remote units which are branched from and connected to the first headend unit 100-1 and the second headend unit 100-2 and which are connected in cascade to restore a mobile communication signal from a downlink frame received from the first headend unit 100-1 or the second headend unit 100-2 and transmit the mobile communication signal through an antenna in a wireless manner. In FIG. 8, a remote unit 5-1 410 connected to the active headend unit 100-A, a remote unit 5-2 412 connected to the remote unit 5-1 410 in cascade, and a remote unit 5-3 414 connected to the remote unit 5-2 412 in cascade constitute the third branch group 400.

According to an aspect, the remote unit may be connected to the headend unit and may be connected in cascade to a sub-remote unit connected to a cascade port. The invention is not limited thereto, and other connection methods may be used according to a required system capacity or the like.

The fourth branch group 500 may include a plurality of remote units which are branched from and connected to the first headend unit 100-1 and the second headend unit 100-2 and which are connected in cascade to restore a mobile communication signal from downlink frames received from the first headend unit 100-1 and the second headend unit 100-2 and transmit the mobile communication signal through an antenna in a wireless manner. In FIG. 8, a remote unit 6-1 510 connected to the active headend unit 100-A, a remote unit 6-2 512 connected to the remote unit 6-1 510 in cascade, and a remote unit 6-3 514 connected to the remote unit 6-2 512 in cascade constitute the fourth branch group 500.

The remote unit of the third branch group 400 or the fourth branch group 500 which is directly connected to the first headend unit 100-1 and the second headend unit 100-2 and which is configured to receive the downlink frame checks a state bit of the control field of the downlink frame, delivers only a downlink frame received from the active headend unit 100-A to a sub-node connected to its downlink port, and discards a downlink frame received from a standby headend unit 100-S.

The remote unit directly connected to the headend unit and the sub-remote unit connected to the cascade port of another remote unit restores mobile communication signals from the distributed downlink frame and transmits the mobile communication signals through an antenna in a wireless manner A plurality of remote units may be connected in cascade.

According to another embodiment of the invention, the first headend unit 100-1 and the second headend unit 100-2 are connected to the remote unit of the third branch group 400 and the remote unit of the fourth branch group 500 through duplication. The first headend unit 100-1 and the second headend unit 100-2 are each determined as the active headend unit 100-A or the standby headend unit 100-S. In an example shown in FIG. 8, the first headend unit 100-1 is in the active state, and the second headend unit 100-2 is in the standby state.

When a downlink frame is received from each of the first headend unit 100-1 and the second headend unit 100-2, the remote unit of the third branch group 400 or the fourth branch group 500 directly connected to the first headend unit 100-1 and the second headend unit 100-2 may store a state bit included in the downlink frame, add the state bit received from each headend unit to a control field of the uplink frame generated by the remote unit or a control field of an uplink frame received from a sub-node connected to the cascade port, and transmit the uplink frame to the first headend unit 100-1 and the second headend unit 100-2.

Upon receiving the uplink frame, the first headend unit 100-1 and the second headend unit 100-2 may process the received uplink frame when their duplication states are active and may discard the received uplink frame when their duplication states are standby.

Also, the active headend unit 100-A may compare the state bit of the control field included in the uplink frame to its duplication state and may transmit a C&M message notifying of its duplication state to the remote unit that has transmitted the corresponding uplink frame when the state bit does not match the duplication state. According to an aspect of the invention, the active headend unit 100-A may increase a count value when continuously receiving an uplink frame with a state bit value of a control field different from its duplication state from a specific remote unit and may deliver a control command that resets the remote unit that has transmitted the corresponding uplink frame when the count value is greater than a predetermined threshold value.

According to another embodiment of the invention, the remote unit of the third branch group 400 or the fourth branch group 500 directly connected to the first headend unit 100-1 and the second headend unit 100-2 may perform quality measurement on the downlink frame. At this time, the remote unit may add the measured BER value to the control field of the uplink frame and transmit the uplink frame to the first headend unit 100-1 and the second headend unit 100-2.

The first headend unit 100-1 and the second headend unit 100-2 may acquire a BER value indicating the downlink quality included in the uplink frame and thus determine the downlink quality.

In this case, when the received BER value is greater than a predetermined BER threshold value, the active headend unit 100-A may determine whether to perform switching and may perform the switching. After performing the switching, the duplication state of the headend unit is changed from the active state to the standby state or from the standby state to the active state.

Figure 9:
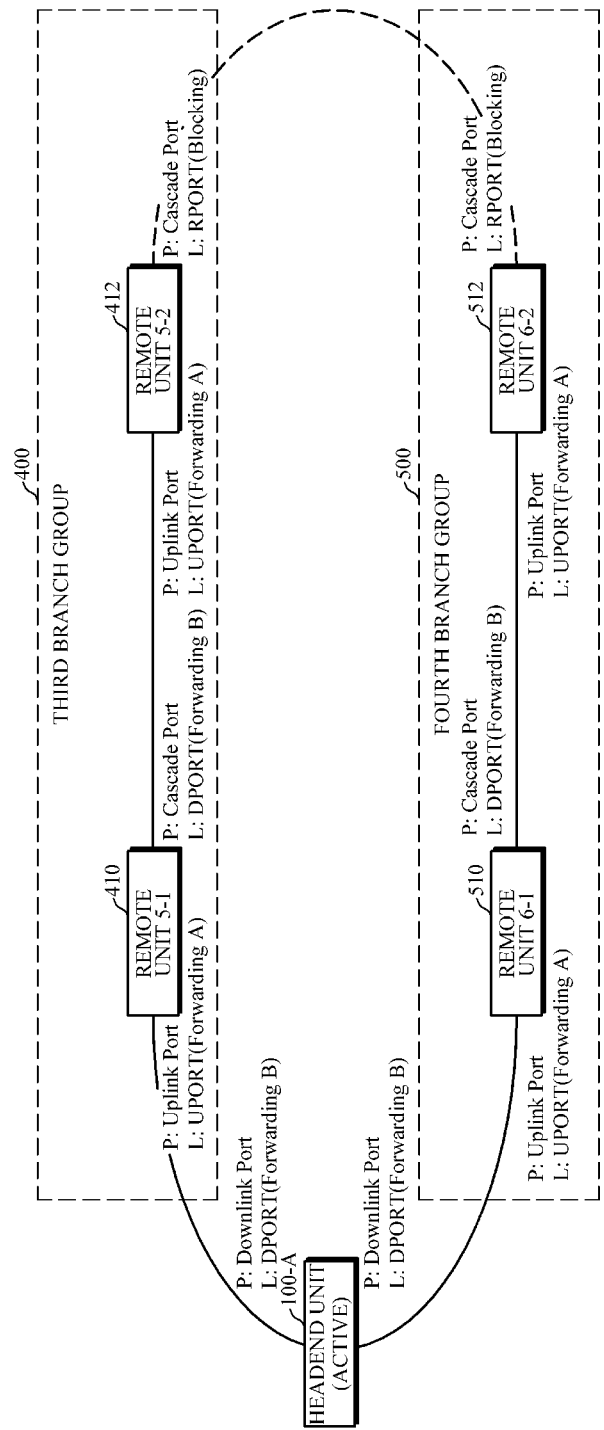
FIG. 9 is a diagram conceptually showing link duplication of a radio unit in a distributed antenna system according to another embodiment.

FIG. 9 is a diagram conceptually showing link duplication of a radio unit through a duplication configuration of a distributed antenna system according to another embodiment. According to another embodiment of the invention, the first headend unit 100-1 and the second headend unit 100-2 are configured through duplication, and the cascade port of the terminating remote unit of the third branch group 400 and the cascade port of the terminating remote unit of the fourth branch group 500 are connected through the redundancy link in the "Blocking" state. One of the first headend unit 100-1 or the second headend unit 100-2 operates as an active headend unit 100-A.

In this state, when an error occurs in a normal frame transmission path of one branch group, the redundancy link may be activated, and a frame may be transmitted through a normal frame transmission path of another branch group using the activated redundancy link as a bypass.

In the embodiment shown in FIG. 9, a connection between physical ports of a device of the third branch group 400 and the active headend unit 100-A will be described below. The downlink port of the active headend unit 100-A is connected to the uplink port of the remote unit 5-1 410 of the third branch group 400.

Also, the cascade port of the remote unit 5-1 410 is connected to the uplink port of the remote unit 5-2 412 for the purpose of service expansion, and the cascade port of the remote unit 5-2 412 is connected to the cascade port of the remote unit 6-2 512 of the fourth branch group 500 for the purpose of link duplication.

A connection between logical ports of a device of the third branch group 400 and the active headend unit 100-A in the embodiment shown in FIG. 9 will be described below. The DPORT of the active headend unit 100-A is connected to the UPORT of the remote unit 5-1 410 of the third branch group 400, and the DPORT of the remote unit 5-1 410 is connected to the UPORT of the remote unit 5-2 412 for the purpose of service expansion.

Also, the RPORT of the remote unit 5-2 412 is connected to the RPORT of the remote unit 6-2 512 of the fourth branch group 500 for the purpose of link duplication. Physically, the cascade port of the remote unit 5-2 412 is connected to the cascade port of the remote unit 6-2 512 of the fourth branch group 500.

In the embodiment shown in FIG. 9, a forward signal frame that is transmitted through a normal frame transmission path between the active headend unit 100-A and the remote unit 5-2 412 is output from the DPORT of the active headend unit 100-A in the "Forwarding B" state and input to the UPORT of the remote unit 5-1 410 in the "Forwarding A" state and is output from the DPORT of the remote unit 5-1 410 in the "Forwarding B" state and input to the UPORT of the remote unit 5-2 412 in the "Forwarding A" state, and a reverse signal frame is output from the UPORT of the remote unit 5-2 412 in the "Forwarding A" state and input to the DPORT of the remote unit 5-1 410 in the "Forwarding B" state and is output from the UPORT of the remote unit 5-1 410 in the "Forwarding A" state and input to the DPORT of the headend unit 100-A in the "Forwarding B" state. As described above, the frame transmission path is determined according to the state of the logical port of each device.

In the embodiment shown in FIG. 9, the remote unit 6-1 510 and the remote unit 6-2 512 connected to the remote unit 6-1 510 in cascade constitute the fourth branch group 500. Connections between physical ports and logical ports of devices of the fourth branch group 500 and the active headend unit 100-A may be described in the same manner as the above description of the connection between the physical ports of the devices of the third branch group 400.

The physical cascade port of the remote unit located at the end of the cascade structure of the third branch group 400 and the physical cascade port of the remote unit located at the end of the cascade structure of the fourth branch group 500 are connected through the redundancy link in the "Blocking" state.

That is, the RPORT of the remote unit located at the end of the cascade connection of the third branch group 400 and the RPORT of the remote unit located at the end of the cascade connection of the fourth branch group 500 are connected to each other, and each RPORT is managed in the "Blocking" state in order to use this connection as a redundancy link. In the embodiment shown in FIG. 9, the RPORT of the remote unit 5-2 412 and the RPORT of the remote unit 6-2 512 are connected to each other, and each RPORT is in the "Blocking" state.

When an error occurs in a normal frame transmission path of one branch group, the distributed antenna system activates the redundancy link and transmits a frame through a normal frame transmission path of another branch group using the activated redundancy link as a bypass to support high availability. In the embodiment shown in FIG. 9, when frame transmission is not performed due to an error having occurred in a link connection between the remote unit 5-1 410 of the third branch group 400 and the active headend unit 100-A, the redundancy links of the remote unit 5-2 412 and the remote unit 6-2 512 are activated. In this case, a reverse signal frame in the third branch group 400 is delivered to the fourth branch group 500 through the redundancy link and transmitted to the active headend unit 100-A through the normal frame transmission path of the fourth branch group 500, and a forward signal frame for the third branch group 400 is transmitted to the third branch group 400 via the fourth branch group 500 through the redundancy link. According to an aspect of the invention, the remote unit 6-2 512 of the fourth branch group 500 may combine a mobile communication signal of the remote unit 6-2 512 with mobile communication signals of the remote units of the third branch group 400 and transmit the composite signal.

In this case, the active headend unit 100-A should control each device to change its logical port state so that the frame transmission is possible through the redundancy link.

According to another aspect of the invention, when the redundancy link is connected to a remote unit, the remote unit to which the redundancy link is connected transmits redundancy link connection information to all upper nodes connected to the uplink port. In the embodiment shown in FIG. 9, the remote unit 5-2 412 and the remote unit 6-2 512 transmit the redundancy link connection information.

The first headend unit 100-1 and the second headend unit 100-2 receive the redundancy link connection information from the remote unit and store and manage the received redundancy link connection information so that the redundancy link is activated to change the frame transmission path when a link error occurs in the system.

According to another aspect of the invention, the active headend unit 100-A may detect a link error that has occurred in the system. As an example, the active headend unit 100-A periodically exchanges a keepalive message with sub-nodes and thus may determine a link error when the keepalive message is not received for a certain period of time. However, the invention is not limited thereto, and a method of detecting hardware abnormality or frame errors may be used.

When the active headend unit 100-A detects an error having occurred in a normal frame transmission path of one branch group, the active headend unit 100-A requests the activation of the redundancy link from the remote unit at one end to which the redundancy link is connected on the basis of the redundancy link connection information. In this case, by using C&M data, the active headend unit 100-A may request the activation of the redundancy link from a remote unit of another branch group to which the redundancy link is connected from the branch group in which the error has occurred. The active headend unit 100-A may discover the remote unit to which the redundancy link is connected from the stored redundancy link connection information.

The active headend unit 100-A also determines remote units for which frame transmission paths need to be changed on the basis of the topology information. The active headend unit 100-A uses the topology information to determine a device capable of transmitting a frame using a redundancy link from among devices that cannot transmit frames due to a link error and that are included in subordinate devices in the system.

The active headend unit 100-A sends a frame transmission path change request to the determined remote unit. That is, the active headend unit 100-A transmits a port state change request message to a remote unit for which a port state needs to be changed.

Upon receiving a redundancy link activation request, the remote unit requests the activation of the redundancy link by transmitting a redundancy port state change control request to the remote unit at the other end to which the redundancy link is connected through the control field, which is transmitted even in the "Blocking" state, and activates the redundancy link by changing the redundancy port state.

It is assumed that an error occurs in a link connection between the remote unit 5-1 410 of the third branch group 400 and the active headend unit 100-A in the distributed antenna system shown in FIG. 9. Upon detecting an error in a corresponding link, the active headend unit 100-A changes the state of the DPORT connected to the remote unit 5-1 410 from "Forwarding B" to "Blocking" so as to prevent a loop that may occur due to the redundancy link activation and requests the activation of the redundancy link from the remote unit 6-2 512 of the fourth branch group 500 using the C&M data with reference to the redundancy link connection information. The remote unit 6-2 512 requests the activation of the redundancy link from the remote unit 5-2 412 of the third branch group 400 to which the redundancy link is connected using the control field. The remote unit 5-2 412 changes the state of the RPORT from "Blocking" to "Forwarding A." The remote unit 6-2 512 changes the state of the RPORT from "Blocking" to "Forwarding B" to activate the redundancy link. The active headend unit 100-A recognizes, from the topology information, that frames of the remote unit 5-1 410 and the remote unit 5-2 412 can be transmitted through the redundancy link and determines the remote unit 5-1 410 and the remote unit 5-2 412 as nodes for which frame transmission paths need to be changed. The active headend unit 100-A transmits the C&M data to the remote unit 5-1 410 and the remote unit 5-2 412 (through the redundancy link) to request the change of the port state. The remote unit 5-1 410 changes the state of the UPORT from "Forwarding A" to "Blocking" and changes the state of the DPORT from "Forwarding B" to "Forwarding A." The remote unit 5-2 412 changes the state of the UPORT from "Forwarding A" to "Forwarding B."

Figure 10:
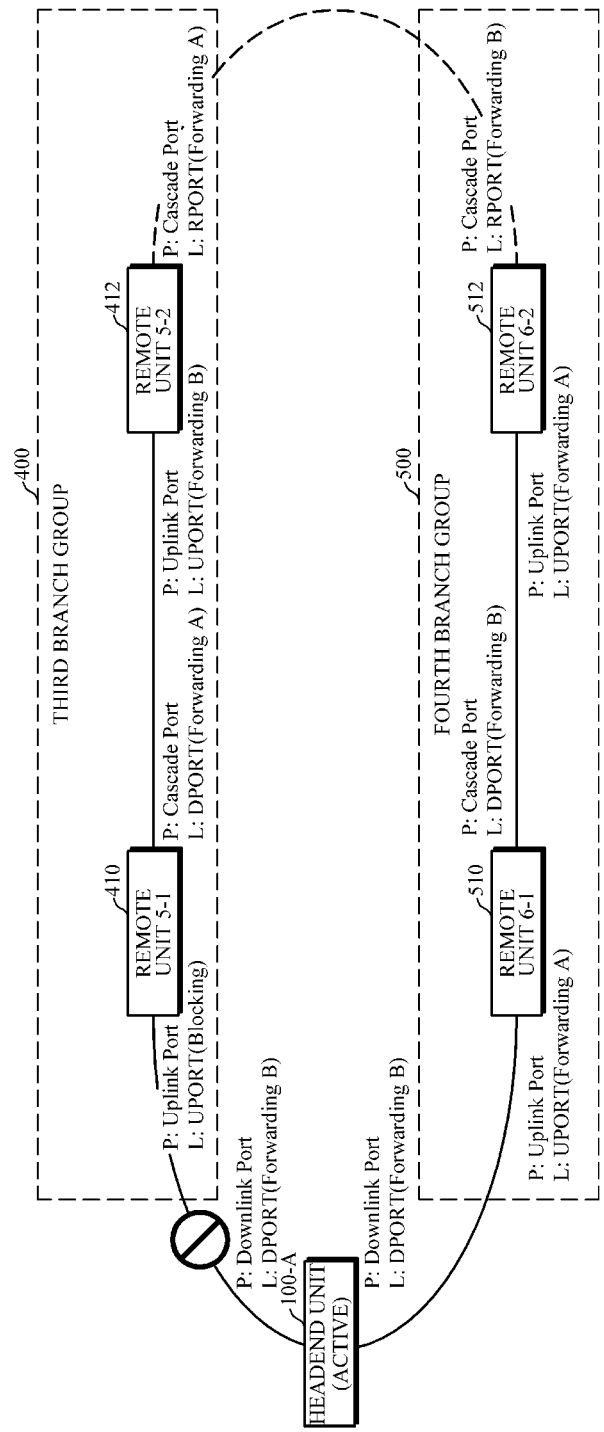
FIG. 10 shows a change of a frame path due to a link error between an active headend unit and a remote unit 1 410 in the embodiment shown in FIG. 9.

FIG. 10 shows a change of a frame path due to a link error between an active headend unit and a remote unit in the embodiment shown in FIG. 9. As shown in FIG. 10, a reverse signal frame is transmitted from the remote unit 5-1 410 to the active headend unit 100-A through the remote unit 5-2 412, the remote unit 6-2 512, and the remote unit 6-1 510 in sequence, and a forward signal frame is transmitted from the active headend unit 100-A to the remote unit 5-1 410 through the remote unit 6-1 510, the remote unit 6-2 512, and the remote unit 5-2 412 in sequence.

According to another aspect of the invention, the active headend unit 100-A may detect the recovery of the error that has occurred. When the active headend unit 100-A detects that the link connection in which the error has occurred is restored, the active headend unit 100-A requests the blocking of the redundancy path from the remote unit at one end to which the redundancy link is connected on the basis of the redundancy link connection information. In this case, by using the C&M data, the active headend unit 100-A may request the blocking of the redundancy link from a remote unit of another branch group to which the redundancy link is connected from the branch group in which the error has occurred. The active headend unit 100-A may discover the remote unit to which the redundancy link is connected from the stored redundancy link connection information.

The active headend unit 100-A also determines remote units for which frame transmission paths need to be changed to switch to the normal frame transmission path on the basis of the topology information. The active headend unit 100-A uses the topology information to determine a device for which a frame transmission path is to be changed due to a link error and which requires switching to the normal frame transmission path from among subordinate devices in the system.

The active headend unit 100-A transmits a frame transmission path change request to the determined remote unit. That is, the active headend unit 100-A transmits a port state change request message to a remote unit for which a port state needs to be changed.

Upon receiving a redundancy link blocking request, the hub unit requests the blocking of the redundancy link by transmitting a redundancy port state change control request to the remote unit at the other end to which the redundancy link is connected through the control field and blocks the redundancy link by changing the redundancy port state.

A case in which the link error having occurred between the active headend unit 100-A and the remote unit 5-1 410 as shown in FIG. 10 is recovered will be described below. When the active headend unit 100-A detects the recovery of the error in the corresponding link, the active headend unit 100-A determines the restoration of the normal frame transmission path. The active headend unit 100-A determines a sub-node for which a frame transmission path needs to be changed due to the restoration of the normal frame transmission path on the basis of the topology information. In this example, the active headend unit 100-A determines the remote unit 5-1 410 and the remote unit 5-2 412 as nodes for which frame transmission paths need to be changed. The active headend unit 100-A transmits the C&M data to the remote unit 5-1 410 and the remote unit 5-2 412 (through the redundancy link) to request the change of the port state. The remote unit 5-1 410 changes the state of the UPORT from "Blocking" to "Forwarding A" and changes the state of the DPORT from "Forwarding A" to "Forwarding B." The remote unit 5-2 412 changes the state of the UPORT from "Forwarding B" to "Forwarding A."

The active headend unit 100-A requests the blocking of the redundancy link from the remote unit 6-2 512 of the fourth branch group 500 using the C&M data with reference to the redundancy link connection information. The remote unit 6-2 512 requests the blocking of the redundancy link from the remote unit 5-2 412 of the third branch group 400 to which the redundancy link is connected using the control field. The remote unit 5-2 412 changes the state of the RPORT from "Forwarding A" to "Blocking." The remote unit 6-2 512 changes the state of the RPORT from "Forwarding B" to "Blocking" to block the redundancy link.

The active headend unit 100-A changes the state of the DPORT connected to the remote unit 5-1 410 from "Blocking" to "Forwarding B" to complete switching to the normal frame transmission path. When the switching is completed, the state of the diagram shown in FIG. 9 is obtained.

According to another embodiment of the invention, the distributed antenna system in which the headend unit is duplicated may switch an abnormal active headend unit into the standby state and may switch a standby headend unit into the active state.

The switching method for duplication may include an operation in which a hub unit or a remote unit directly connected to a first headend unit 100-1 and a second headend unit 100-2 performs quality measurement on a downlink frame, an operation in which the hub unit or the remote unit directly connected to the first headend unit 100-1 and the second headend unit 100-2 adds a measured BER value to a control field of an uplink frame and transmits the uplink frame to the first headend unit 100-1 and the second headend unit 100-2, an operation in which an active headend unit 100-A compares the BER value to a predetermined BER threshold value and determines whether to perform switching, and an operation in which the active headend unit 100-A determines to perform the switching and then performs the switching according to the determination when the received BER value is greater than the predetermined BER threshold value.

According to another aspect of the invention, the duplication method for the distributed antenna system includes an operation in which the active headend unit 100-A detects an error, an operation of determining a sub-node to be controlled, an operation of blocking the downlink port, and an operation of requesting the activation of the redundancy link.

The active headend unit 100-A should be aware of redundancy link connection information and topology information of the distributed antenna system in order to duplicate a frame transmission path. The active headend unit 100-A may acquire the topology information and the redundancy link connection information in the initial setup operation for the distributed antenna system.

Figure 11:
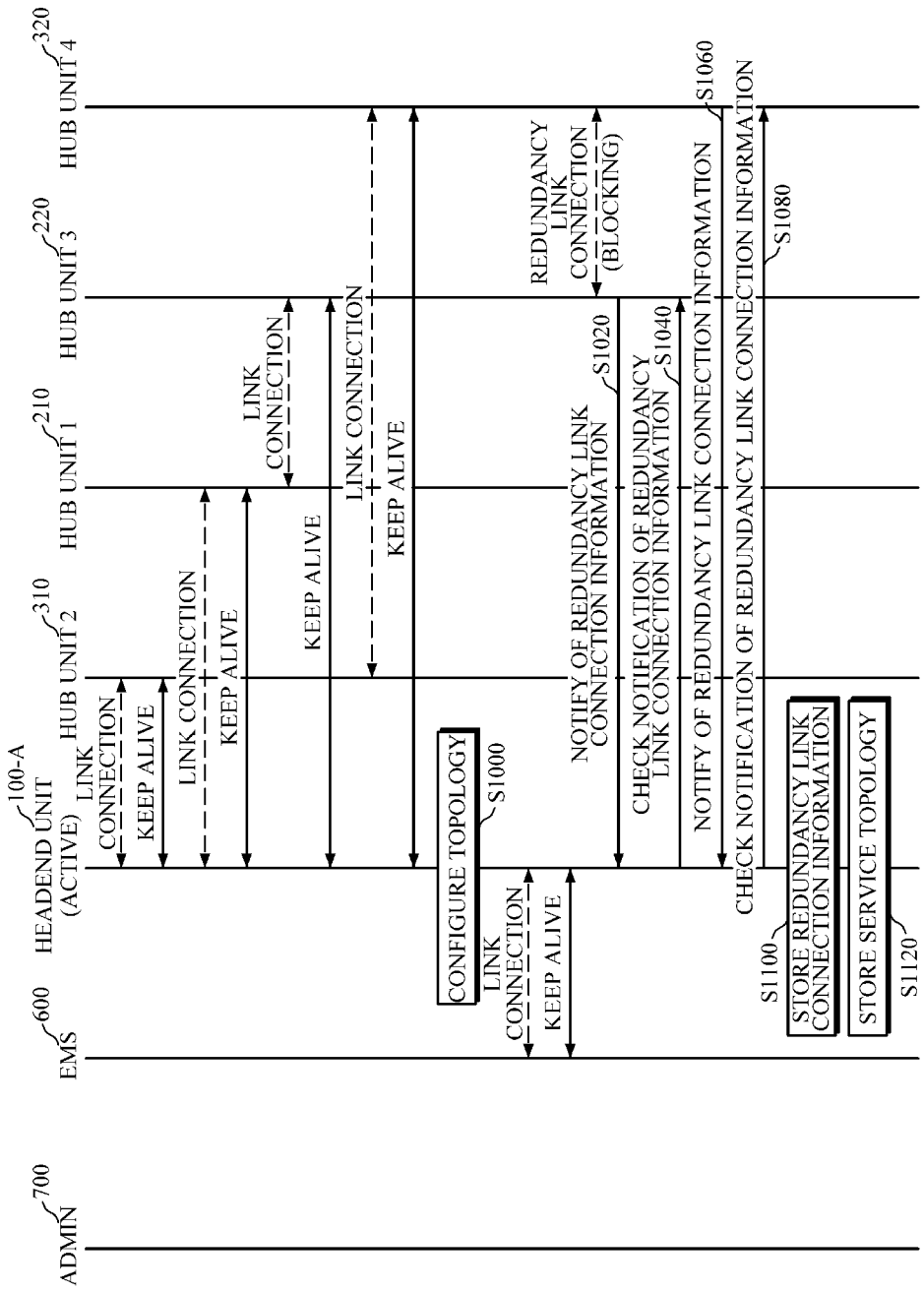
FIG. 11 is a sequence diagram showing an initial setup procedure of a distributed antenna system according to the embodiment shown in FIG. 6.

FIG. 11 is a sequence diagram showing an initial setup procedure of a distributed antenna system according to the embodiment shown in FIG. 6. As shown in FIG. 11, when a link between devices is connected, the active headend unit 100-A and sub-nodes (in this example, the hub unit 1 210, the hub unit 2 310, the hub unit 3 220, and the hub unit 4 320) exchange a keepalive with each other to check a link connection state and an opponent's state. In this case, the active headend unit 100-A may configure a topology including sub-nodes that transmit a keepalive (S1000).

A redundancy link may also be connected in the "Blocking" state. When the connection is made, devices to which the redundancy link is connected, that is, the hub unit 2 310 and the hub unit 4 320, transmit redundancy link connection information to the active headend unit 100-A (S1020 and S1060). The active headend unit 100-A stores received redundancy link connection information (S1100) to complete an initial setup procedure.

The operation in which the active headend unit 100-A detects an error is an operation of detecting an error that has occurred in a frame transmission path. As an example, the active headend unit 100-A periodically exchanges a keepalive message with sub-nodes and thus may determine a link error when the keepalive message is not received for a certain period of time. However, the invention is not limited thereto, and a method of detecting hardware abnormality or frame errors may be used.

The operation in which the active headend unit 100-A determines sub-nodes to be controlled is an operation in which, upon detecting an error having occurred in the frame transmission path, the active headend unit 100-A determines whether to switch the frame transmission path using the redundancy link on the basis of the stored topology information and redundancy link connection information and determines a sub-node for which a redundancy path is to be activated and a frame transmission path is to be changed.

The operation in which the active headend unit 100-A blocks the downlink port is an operation in which the active headend unit 100-A blocks the downlink port for the frame transmission path in which the error has occurred. The active headend unit 100-A can prevent a frame from being lost because the frame is transmitted in the frame transmission path in which the error has occurred and can prevent a loop that may be generated due to redundancy link activation by blocking its downlink port.

The operation in which the active headend unit 100-A requests the activation of the redundancy link is an operation in which the active headend unit 100-A requests the activation of the redundancy link from the sub-node at one end to which the redundancy link is connected from the branch group in which the error has occurred. In this case, the request is transmitted using C&M data.

According to another embodiment of the invention, the duplication method for the distributed antenna system may include an operation in which the active headend unit 100-A detects an error, an operation of determining a sub-node to be controlled, an operation of blocking a downlink port, and an operation of requesting the activation of a redundancy link and may further include an operation in which the sub-node that has received the redundancy link activation request transmits a redundancy port state change request control field, and an operation of activating the redundancy link.

The operation in which the sub-node that has received the redundancy link activation request transmits a redundancy port state change request control field is an operation in which the sub-node that has received the redundancy link activation request transmits the redundancy port state change request to the sub-node at the other end to which the redundancy link is connected through the control field, which is transmitted even in the "Blocking" state. The sub-node that has received the redundancy link activation request may be a hub unit or a remote unit to which the redundancy link is connected. The sub-node at the other end to which the redundancy link is connected may be a hub unit or a remote unit, which is an opponent device to which the redundancy link is connected. However, the redundancy link is connected from one hub unit to another hub unit and is connected from one remote unit to another remote unit.

The operation in which the sub-node that has received the redundancy link activation request activates the redundancy link is an operation in which the sub-node that has received the redundancy link activation request changes its redundancy port state to activate the redundancy link.

According to another embodiment of the invention, the duplication method for the distributed antenna system may include an operation in which the active headend unit 100-A detects an error, an operation of determining a sub-node to be controlled, an operation of blocking a downlink port, an operation of requesting the activation of a redundancy link, an operation in which the sub-node that has received a redundancy link activation request transmits a redundancy port state change request control field, and an operation of activating the redundancy link and may further include an operation in which the active headend unit 100-A requests a path setting change.

The operation in which the active headend unit 100-A requests a path setting change is an operation in which the active headend unit 100-A transmits a path setting change request to a sub-node determined as a node for which a frame transmission path is to be changed. Upon receiving this request, sub-nodes change the state of logical ports according to the request from the active headend unit 100-A to change the frame transmission path to use the redundancy path.

Figure 12:
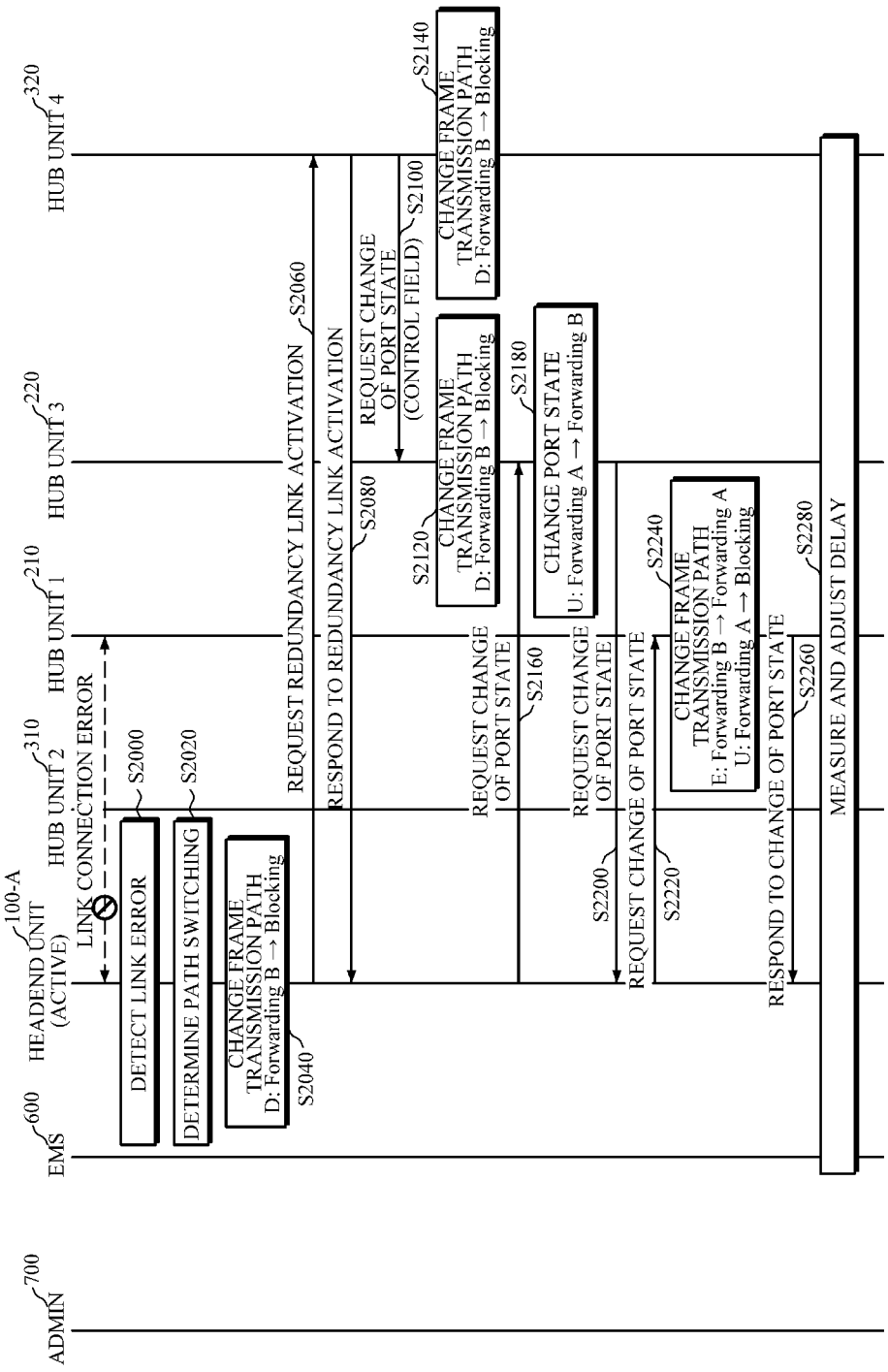
FIG. 12 is a sequence diagram showing a frame transmission path switching procedure due to an error that has occurred in a distributed antenna system according to the embodiment shown in FIG. 6.

FIG. 12 is a sequence diagram showing a frame transmission path switching procedure due to an error that has occurred in a distributed antenna system according to the embodiment shown in FIG. 6. The frame transmission path switching will be described below with reference to FIG. 12. The active headend unit 100-A detects an error occurring in a normal frame transmission path of one branch group (S2000). The active headend unit 100-A determines whether to switch the frame transmission path using the redundancy link on the basis of the stored topology information and redundancy link connection information and determines a redundancy path to be activated and a sub-node for which a frame transmission path is to be changed (S2020).

The active headend unit 100-A changes the state of the DPORT connected to the branch group in which the error has occurred from "Forwarding B" to "Blocking" (S2040) and transmits a redundancy link activation request to the hub unit 4 320 to which the redundancy link is connected using C&M data on the basis of the redundancy link connection information (S2060).

The hub unit 4 320 requests the change of the port state from the hub unit 3 220 through the control field, which can be transmitted even in the "Blocking" state, (S2100), and upon receiving the request, the hub unit 3 220 changes the state of the RPORT from "Blocking" to "Forwarding A" (S2120). The hub unit 4 320 changes the state of the RPORT from "Blocking" to "Forwarding B" to activate the redundancy link (S2140).

The active headend unit 100-A requests the change of the frame transmission path by transmitting a port state change request to the hub unit 1 210 and the hub unit 2 310 for which port states need to be changed so as to change the frame transmission path (S2160 and S2220). The hub unit 1 210 changes the state of the UPORT from "Forwarding A" to "Blocking" and changes the state of the EPORT from "Forwarding B" to "Forwarding A" (S2240). The hub unit 3 220 changes the state of the UPORT from "Forwarding A" to "Forwarding B" (S2180).

The distributed antenna system measures and adjusts the delay of a frame to be transmitted after the frame transmission path is changed (S2280).

According to another aspect of the invention, the duplication method for the distributed antenna system includes an operation in which the active headend unit 100-A detects the recovery of the error, an operation of determining a sub-node for which a path needs to be changed, an operation of requesting a path setting change, and an operation of requesting the blocking of the redundancy link.

The operation in which the active headend unit 100-A detects the recovery of the error is an operation in which the active headend unit 100-A detects that an error that occurs on the frame transmission path and causes the change of the frame transmission path is recovered.

The operation in which the active headend unit 100-A determines a sub-node for which a path needs to be changed is an operation in which the active headend unit 100-A determines a sub-node for which a frame transmission path needs to be changed to switch to the normal frame transmission path on the basis of the stored topology information and redundancy link connection information.

The operation in which the active headend unit 100-A requests a path setting change is an operation in which the active headend unit 100-A requests a path setting change from a sub-node determined as a node for which a frame transmission path is to be changed. In this operation, the active headend unit 100-A transmits a port state change request to sub-nodes for which port states should be changed to switch to the normal frame transmission path.

The operation in which the active headend unit 100-A requests the blocking of the redundancy link is an operation in which, by using C&M data, the active headend unit 100-A requests the blocking of the redundancy link from the sub-node at one end to which the redundancy link is connected from the branch group in which the error is recovered.

According to another embodiment of the invention, the duplication method for the distributed antenna system may include an operation in which the active headend unit 100-A detects the recovery of the error, an operation of determining a sub-node for which a path needs to be changed, an operation of requesting a path setting change, and an operation of requesting the blocking of the redundancy link and may further include an operation in which a sub-node that has received the redundancy link blocking request transmits a redundancy port state change request control field and an operation of blocking the redundancy link.

The operation in which the sub-node that has received the redundancy link blocking request transmits a redundancy port state change request control field is an operation of transmitting, through the control field, a redundancy port state change request to the sub-node at the other end to which the redundancy link is connected. The sub-node that has received the redundancy link blocking request may be a hub unit or a remote unit to which the redundancy link is connected. The sub-node at the other end to which the redundancy link is connected may be a hub unit or a remote unit, which is an opponent device to which the redundancy link is connected. However, the redundancy link is connected from one hub unit to another hub unit and is connected from one remote unit to another remote unit.

The operation in which the sub-node that has received the redundancy link blocking request blocks the redundancy link is an operation in which the sub-node that has received the redundancy link blocking request changes its redundancy port state to block the redundancy link.

According to another embodiment of the invention, the duplication method for the distributed antenna system may include an operation in which the active headend unit 100-A detects the recovery of the error, an operation of determining a sub-node for which a path needs to be changed, an operation of requesting a path setting change, an operation of requesting the blocking of the redundancy link, an operation in which a sub-node that has received the redundancy link blocking request transmits a redundancy port state change request control field, and an operation of blocking the redundancy link and may further include an operation in which the active headend unit 100-A activates the downlink port.

The operation in which the active headend unit 100-A activates the downlink port is an operation in which the active headend unit 100-A activates the downlink port for the frame transmission path in which an error has occurred. When the active headend unit 100-A activates the downlink port before the frame transmission path is completely restored to the normal frame transmission path, frames may be lost, and a loop may occur on the frame transmission path. Accordingly, after blocking the redundancy link and changing the port state of sub-nodes to a state that allows the restoration to the normal frame transmission path, the active headend unit 100-A activates the downlink port of the active headend unit 100-A last.

Figure 13:
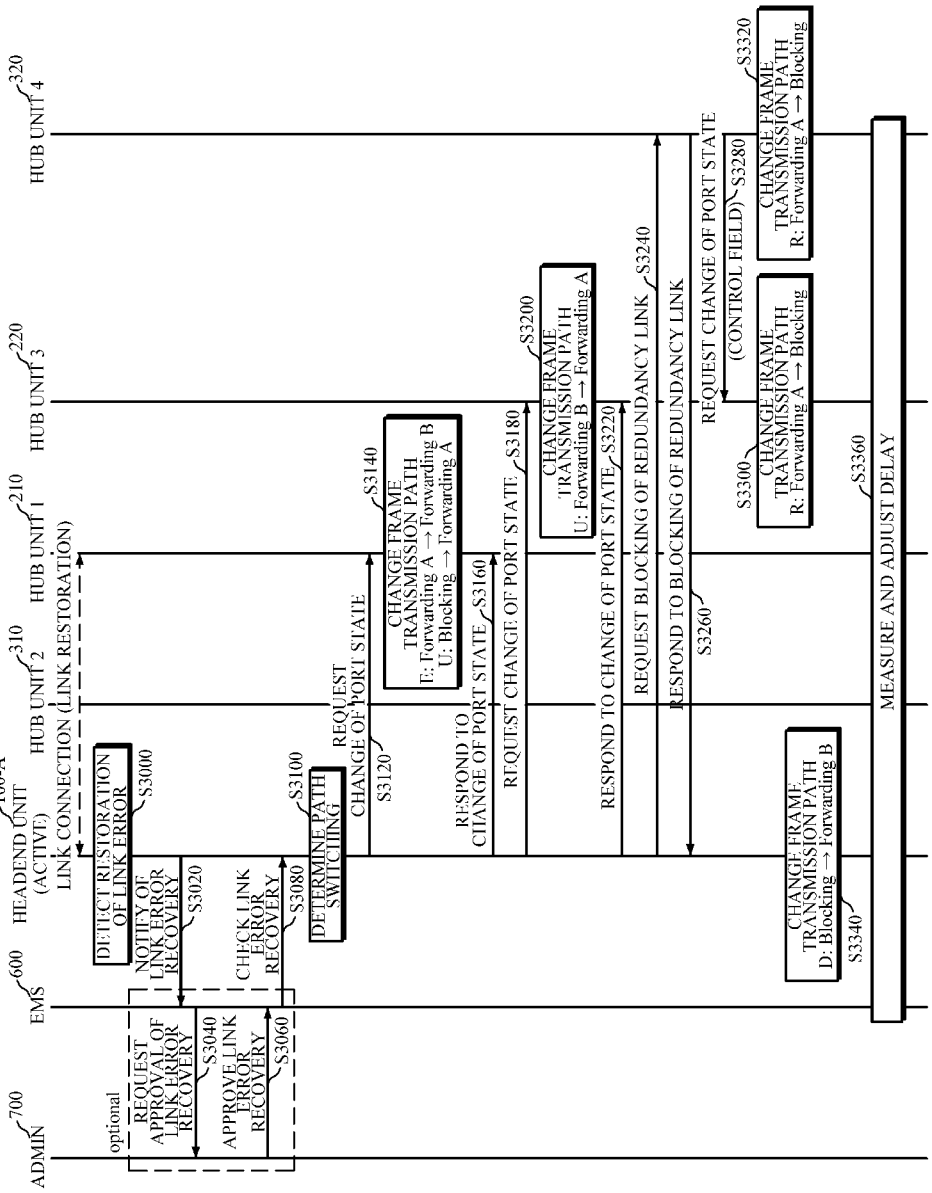
FIG. 13 is a sequence diagram showing a procedure of recovering an error and restoring a normal frame transmission path in a distributed antenna system according to the embodiment shown in FIG. 7.

FIG. 13 is a sequence diagram showing a procedure of recovering an error and restoring a normal frame transmission path in a distributed antenna system according to the embodiment shown in FIG. 7. A procedure in which a frame transmission path is restored into a normal frame transmission path will be described with reference to FIG. 13. The active headend unit 100-A detects that a link connection error of a branch group in which the error has occurred is recovered (S3000). The active headend unit 100-A notifies an element management system (EMS) 600 that the link error is recovered (S3020). In this case, the EMS 600 may send a link error recovery approval request (an approval request for restoration to a normal frame transmission path) to an administrator (ADMIN) 700 (S3040) and may receive the approval from the administrator 700 and proceed with the recovery procedure (S3060). However, this is optional and is not a necessary procedure.

The active headend unit 100-A determines to restore the normal frame transmission path and determines a redundancy path to be blocked and a sub-node for which a frame transmission path is to be changed on the basis of the stored topology information and redundancy link connection information (S3100).

The active headend unit 100-A requests the change of the frame transmission path by transmitting a port state change request to the hub unit 1 210 and the hub unit 2 310 for which port states need to be changed so as to restore the normal frame transmission path (S3120 and S3180). The hub unit 1 210 changes the state of the UPORT from "Blocking" to "Forwarding A" and changes the state of the EPORT from "Forwarding A" to "Forwarding B" (S3140). The hub unit 3 220 changes the state of the UPORT from "Forwarding B" to "Forwarding A" (S3200).

The active headend unit 100-A transmits a redundancy link blocking request to the hub unit 4 320 to which the redundancy link is connected using C&M data on the basis of the redundancy link connection information (S3240).

The hub unit 4 320 requests the change of the port state from the hub unit 3 220 through the control field (S3280), and the hub unit 3 220, which has received the request, changes the state of RPORT from "Forwarding A" to "Blocking" (S3300). The hub unit 4 320 changes the state of the RPORT from "Forwarding B" to "Blocking" to block the redundancy link (S3320).

The active headend unit 100-A changes the state of the DPORT connected to the branch group in which the error is recovered from "Blocking" to "Forwarding B" to complete restoration of the normal frame transmission path.

The distributed antenna system measures and adjusts the delay of a frame to be transmitted after the frame transmission path is changed (S3360).

Figure 16:
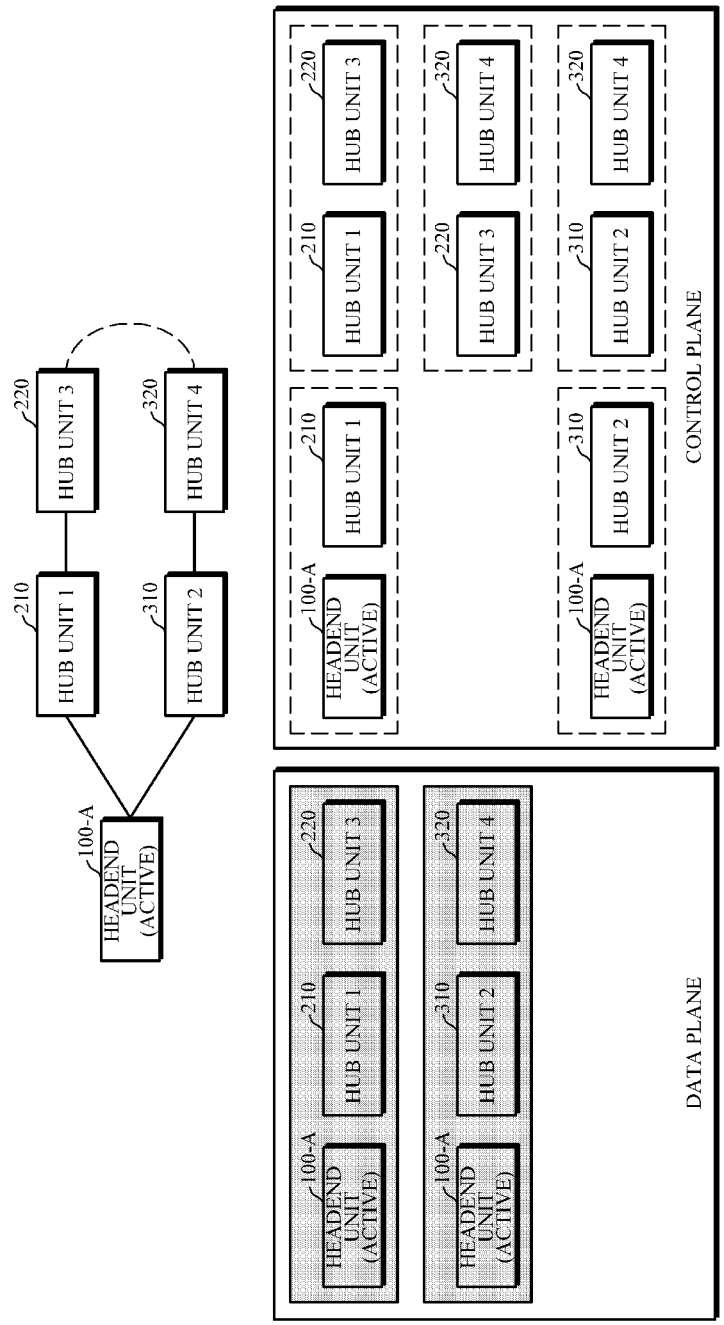
FIG. 16 is a diagram showing a connection between system units of a distributed antenna system in a data plane side and a control plane side.
Figure 17:
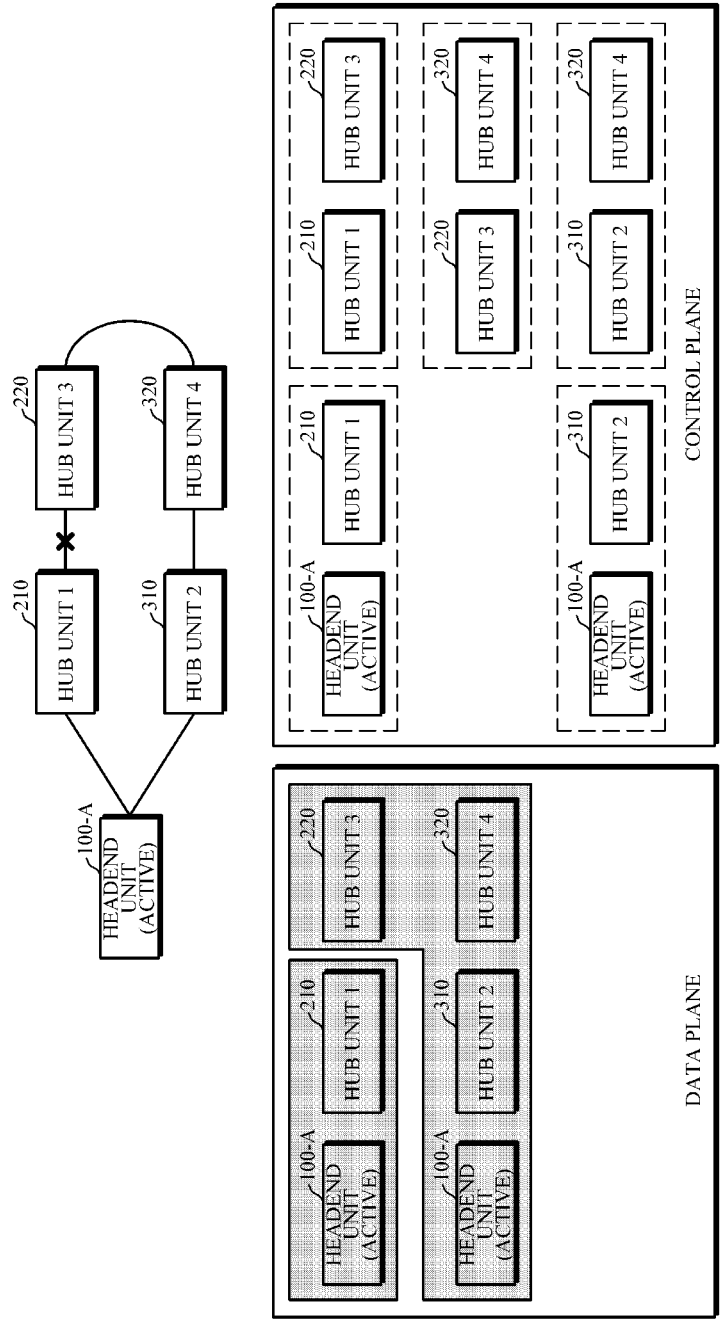
FIG. 17 is a diagram showing changes in a data plane when a link error occurs in a connection between system units of a distributed antenna system.

FIG. 16 shows a connection between system units of a distributed antenna system in a data plane side and a control plane side, and FIG. 17 shows changes in a data plane when a link error occurs in a connection between system units of a distributed antenna system.

FIG. 16 shows that signal data and C&M data are delivered in a data plane and a control field is delivered in a control plane. In this case, the active headend unit 100-A is connected to the hub unit 1 210 of the first branch group 200, the hub unit 3 220 is connected to the hub unit 1 210, the active headend unit 100-A is connected to the hub unit 2 310 of the second branch group 300, and the hub unit 4 320 is connected to the hub unit 2 310.

In a connection between system units 800 shown in FIG. 16, the data plane for processing the signal data and the C&M data is divided into two networks. The data plane is divided into a network including the active headend unit 100-A, the hub unit 1 210, and the hub unit 3 220 and a network including the active headend unit 100-A, the hub unit 2 310, and the hub unit 4 320. The signal data and the C&M data are transmitted in the same network.

Since the control field is transmitted between directly connected units and is transmitted even in the "Blocking" state, there are five networks as shown in FIG. 16.

As described in FIG. 17, when an error occurs in a link connected between the hub unit 1 210 and the hub unit 3 220, the network division of the data plane is changed. The data plane is divided into a network including the active headend unit 100-A and the hub unit 1 210 and a network including the active headend unit 100-A, the hub unit 2 310, the hub unit 4, and hub unit 3. The control plane does not allow the network division to be changed. However, a network state between the hub unit 1 210 and the hub unit 3 220, the state of the hub unit 3 220, and the state of the hub unit 4 320 are changed.

The present invention has been described above with reference to embodiments referring to the accompanying drawings, but is not limited thereto. Rather, the present invention should be construed as encompassing various modifications that may be apparent to those skilled in the art. The appended claims are intended to cover such modifications.

The invention claimed is:

1. A distributed antenna system connected to a first base station and a second base station, which provide a duplication-based service, and configured to support high availability, the distributed antenna system comprising:
   a first headend unit configured to receive a mobile communication signal from the first base station, generate and transmit a downlink frame, and configure and manage topology information of the distributed antenna system;
   a second headend unit configured to receive a mobile communication signal from the second base station, generate and transmit a downlink frame, and configure and manage topology information of the distributed antenna system; and
   a first branch group and a second branch group each comprising a hub unit branched from and connected to the first headend unit and the second headend unit and configured to distribute a downlink received from the first headend unit or the second headend unit to a sub-node connected to a downlink port and a plurality of remote units connected to the hub unit as a sub-node and configured to restore a mobile communication signal from the distributed downlink frame and transmit the mobile communication signal in a wireless manner,
   wherein
   one of the first headend unit or the second headend unit is in an active state, the other headend unit is in a standby state, and each headend unit adds a state bit indicating a duplication state to a control field of the downlink frame and then transmits the downlink frame, and
   the hub unit of the first branch group or the second branch group that has received the downlink frame delivers only a frame received from an active headend unit to the sub-node connected to the downlink port.

2. The distributed antenna system of claim 1, wherein
the hub unit of the first branch group or the second branch group directly connected to the first headend unit and the second headend unit adds a state bit received from each headend unit to a control field of an uplink frame received from a sub-node connected to an extension port or a downlink port and transmits the uplink frame to the first headend unit and the second headend unit, and
the first headend unit and the second headend unit process a received uplink frame when a corresponding duplication state is active and discard a received uplink frame when a corresponding duplication state is standby.

3. The distributed antenna system of claim 1, wherein
the hub unit of the first branch group or the second branch group directly connected to the first headend unit and the second headend unit performs quality measurement on the downlink frame, adds a measured bit error rate (BER) value to a control field of an uplink frame, and transmits the uplink frame, and
the first headend unit or the second headend unit acquires a BER value indicating downlink quality included in the uplink frame, and the active headend unit performs switching when the BER value is greater than a predetermined BER threshold value.

4. The distributed antenna system of claim 1, wherein
an extension port of the hub unit of the first branch group and an extension port of the hub unit of the second branch group are connected through a redundancy link in a blocking state, and
when an error occurs in a normal frame transmission path of one branch group, the redundancy link is activated, and a frame is transmitted through a normal fame transmission path of another branch group using the activated redundancy link as a bypass.

5. The distributed antenna system of claim 4, wherein
the first branch group or the second branch group further comprises an extension hub unit connected to the extension port of the hub unit and a plurality of remote units connected to the extension hub unit as sub-nodes, and
an extension port of the hub unit of the first branch group and an extension port of the hub unit of the second branch group, which are not connected to other devices, are connected through the redundancy link in the "Blocking" state.

6. The distributed antenna system of claim 4, wherein
when the redundancy link is connected, the hub unit transmits redundancy link connection information to all upper nodes connected to an uplink port, and
the first headend unit and the second headend unit store and manage redundancy link connection information received from the hub unit.

7. The distributed antenna system of claim 6, wherein
when an error having occurred in a normal frame transmission path of one branch group is detected, the active headend unit requests the activation of the redundancy link from the hub unit at one end to which the redundancy link is connected on the basis of the redundancy link connection information, determines a hub unit for which a frame transmission path needs to be changed on the basis of the topology information, and sends a frame transmission path change request to the determined hub unit, and
the hub unit that has received the redundancy link activation request requests the activation of the redundancy link by transmitting a redundancy port state change request to the hub unit at the other end to which the redundancy link is connected through a control field, which is transmitted even in the blocking state, and activates the redundancy link by changing a redundancy port state.

8. The distributed antenna system of claim 7, wherein
when the recovery of the error having occurred is detected, the active headend unit requests the blocking of a redundancy path from the hub unit at one end to which the redundancy link is connected on the basis of the redundancy link connection information, determines a hub unit for which a frame transmission path needs to be changed to switch to the normal frame transmission path on the basis of the topology information, and sends a frame transmission path change request to the determined hub unit, and
the hub unit that has received the redundancy path blocking request requests the blocking of the redundancy path by transmitting a redundancy port state change request to the hub unit at the other end to which the redundancy link is connected through the control field and blocks the redundancy link by changing a redundancy port state.

9. A distributed antenna system connected to a first base station and a second base station which provide a duplication-based service and configured to support high availability, the distributed antenna system comprising:
a first headend unit configured to receive a mobile communication signal from the first base station, generate and transmit a downlink frame, and configure and manage topology information of the distributed antenna system;
a second headend unit configured to receive a mobile communication signal from the second base station, generate and transmit a downlink frame, and configure and manage topology information of the distributed antenna system; and
a third branch group and a fourth branch group each comprising a plurality of remote units branched from and connected to the first headend unit and the second headend unit, configured to restore a mobile communication signal from a downlink frame received from the first headend unit or the second headend unit and transmit the mobile communication signal through an antenna in a wireless manner, and connected to one another in cascade,
wherein
one of the first headend unit or the second headend unit is in an active state, the other headend unit is in a standby state, and each headend unit adds a state bit indicating a duplication state to a control field of the downlink frame and then transmits the downlink frame, and
the remote unit of the third branch group or the fourth branch group that has received the downlink frame delivers only a frame received from an active headend unit to a sub-node connected to a cascade port.

10. The distributed antenna system of claim 9, wherein
the remote unit of the third branch group or the fourth branch group directly connected to the first headend unit and the second headend unit adds a state bit received from each headend unit to a control field of an uplink frame generated by the remote unit and a control field of an uplink frame received from the sub-node connected to the cascade port and transmits the uplink frame to the first headend unit and the second headend unit, and the first headend unit and the second headend unit process a received uplink frame when a corresponding duplication state is active and discard a received uplink frame when a corresponding duplication state is standby.

11. The distributed antenna system of claim 9, wherein
the remote unit of the third branch group or the fourth branch group directly connected to the first headend unit and the second headend unit performs quality measurement on the downlink frame, adds a measured bit error rate (BER) value to a control field of an uplink frame, and transmits the uplink frame, and
the first headend unit or the second headend unit acquires a BER value indicating downlink quality included in the uplink frame, and the active headend unit in which the duplication state is active performs switching when the BER value is greater than a predetermined BER threshold value.

12. The distributed antenna system of claim 9, wherein
a cascade port of the terminating remote unit of the third branch group and a cascade port of the terminating remote unit of the fourth branch group are connected through a redundancy link in a blocking state, and
when an error occurs in a normal frame transmission path of one branch group, the redundancy link is activated, and a frame is transmitted through a normal fame transmission path of another branch group using the activated redundancy link as a bypass.

13. The distributed antenna system of claim 9, wherein
when the redundancy link is connected, the remote unit transmits redundancy link connection information to all upper nodes connected to an uplink port, and
the first headend unit and the second headend unit store and manage redundancy link connection information received from the remote unit.

14. The distributed antenna system of claim 13, wherein
when an error having occurred in a normal frame transmission path of one branch group is detected, the active headend unit requests the activation of the redundancy link from the remote unit at one end to which the redundancy link is connected on the basis of the redundancy link connection information, determines a remote unit for which a frame transmission path needs to be changed on the basis of the topology information, and sends a frame transmission path change request to the determined remote unit, and
the remote unit that has received the redundancy link activation request requests the activation of the redundancy link by transmitting a redundancy port state change request to the remote unit at the other end to which the redundancy link is connected through a control field, which is transmitted even in the blocking state, and activates the redundancy link by changing a redundancy port state.

15. The distributed antenna system of claim 14, wherein
when the recovery of the error having occurred is detected, the active headend unit requests the blocking of a redundancy path from the remote unit at one end to which the redundancy link is connected on the basis of the redundancy link connection information, determines a remote unit for which a frame transmission path needs to be changed to switch to the normal frame transmission path on the basis of the topology information, and sends a frame transmission path change request to the determined remote unit, and
the remote unit that has received the redundancy path blocking request requests the blocking of the redundancy path by transmitting a redundancy port state change request to the remote unit at the other end to which the redundancy link is connected through the control field and blocks the redundancy link by changing a redundancy port state.

16. A duplication method for a distributed antenna system, the duplication method comprising:
an operation in which a hub unit or a remote unit directly connected to a first headend unit and a second headend unit performs quality measurement on a received downlink;
an operation in which the hub unit or the remote unit adds a bit error rate (BER) value obtained by the quality measurement to a control field of an uplink frame and transmits the uplink frame to the first headend unit and the second headend unit;
an operation in which an active headend unit compares the BER value to a predetermined BER threshold value and determines whether to perform switching; and
an operation in which the active headend unit performs the switching according to the switching determination.

17. A duplication method for a distributed antenna system, the duplication method comprising:
an operation in which an active headend unit detects an error having occurred in a frame transmission path;
an operation in which the active headend unit determines a redundancy path to be activated and a hub unit or a remote unit for which a frame transmission path is to be changed on the basis of stored topology information and redundancy link connection information;
an operation in which the active headend unit blocks a downlink port for the frame transmission path in which the error has occurred; and
an operation in which the active headend unit requests the activation of a redundancy link from a hub unit or a remote unit at one end to which the redundancy link is connected from a branch group in which the error has occurred.

18. The duplication method of claim 17, further comprising:
an operation in which the hub unit or the remote unit that has received the redundancy link activation request transmits a redundancy port state change request to a hub unit or a remote unit at the other end to which the redundancy link is connected through a control field, which is transmitted even in a blocking state; and
an operation in which the hub unit or the remote unit that has received the redundancy link activation request changes a redundancy port state of the hub unit or the remote unit to activate the redundancy link.

19. The duplication method of claim 18, further comprising an operation in which the active headend unit requests a path setting change from the hub unit or the remote unit for which the frame transmission path is determined to be changed.

20. A duplication method for a distributed antenna system, the duplication method comprising:
an operation in which an active headend unit detects a recovery of an error having occurred in a frame transmission path;
an operation in which the active headend unit determines a hub unit or a remote unit for which a frame transmission path needs to be changed to switch to a normal frame transmission path on the basis of stored topology information and redundancy link connection information;

an operation in which the active headend unit requests a path setting change from a hub unit or a remote unit for which the frame transmission path is determined to be changed; and an operation in which the active headend unit requests the blocking of the redundancy link from a hub unit or a remote unit at one end to which the redundancy link is connected from a branch group in which the error is recovered.

\* \* \* \* \*